US010113941B2

(12) United States Patent
Kostyukov et al.

(10) Patent No.: US 10,113,941 B2
(45) Date of Patent: Oct. 30, 2018

(54) METHOD FOR AUTOMATIC REAL-TIME DIAGNOSTICS FOR EQUIPMENT THAT GENERATES VIBRATION AND STATIC EQUIPMENT

(71) Applicant: DYNAMICS SCIENTIFIC PRODUCTION CENTER USA, INC., Houston, TX (US)

(72) Inventors: Andrey V. Kostyukov, Omsk (RU); Vladimir N. Kostyukov, Omsk (RU); Alexey V. Kostyukov, Omsk (RU); Sergey N. Boichenko, Omsk (RU)

(73) Assignee: Dynamic Scientific Production Center USA, Inc., Houston, TX (US)

( * ) Notice: Subject to any disclaimer, the term of this patent is extended or adjusted under 35 U.S.C. 154(b) by 0 days.

(21) Appl. No.: 15/670,780

(22) Filed: Aug. 7, 2017

(65) Prior Publication Data

US 2018/0180516 A1    Jun. 28, 2018

Related U.S. Application Data

(60) Provisional application No. 62/439,864, filed on Dec. 28, 2016, provisional application No. 62/439,866, filed on Dec. 28, 2016.

(51) Int. Cl.
*G06F 19/00* (2018.01)
*G01M 99/00* (2011.01)
(Continued)

(52) U.S. Cl.
CPC ............ *G01M 99/005* (2013.01); *G01H 1/00* (2013.01); *G05B 13/024* (2013.01)

(58) Field of Classification Search
CPC ...... G01M 99/005; G05B 13/024; G01H 1/00
See application file for complete search history.

(56) References Cited

U.S. PATENT DOCUMENTS

| | | | | |
|---|---|---|---|---|
| 4,985,857 A | * | 1/1991 | Bajpai ............... | G05B 19/4065 702/184 |
| 6,421,571 B1 | * | 7/2002 | Spriggs ................. | G05B 15/02 345/629 |

(Continued)

OTHER PUBLICATIONS

Zhao, Ke, "An Integrated Approach to Performance Monitoring and Fault Diagnosis of Nuclear Power Systems." PhD diss., University of Tennessee, 2005. http://trace.tennessee.edu/utk_graddiss/2307 (Year: 2005).*

(Continued)

*Primary Examiner* — Michael D Masinick
(74) *Attorney, Agent, or Firm* — Buskop Law Group, P.C.; Wendy Buskop

(57) ABSTRACT

A method for automatic real-time diagnostics for equipment that generates vibration and static equipment with a plurality of sensors installed on or mounted proximate to the equipment that generates vibration and static equipment has at least one peripheral intellectual measurement equipment (PIM) for collecting sensor data and removing signal noise or averaging collected sensor data from a sensor over time, a plurality of diagnostic stations receiving assembled data from the PIM comparing to threshold values for diagnostic features and generating diagnostic information and calculating technical states generate diagnostic prescriptions for each diagnostic feature. The method for automatic real-time diagnostics for equipment that generates vibration and static equipment includes generating simultaneously a Monitor, Trend, Analysis, Report, System and Oscilloscope Executive Dashboards.

31 Claims, 34 Drawing Sheets

(51) Int. Cl.
*G01H 1/00* (2006.01)
*G05B 13/02* (2006.01)

(56) References Cited

U.S. PATENT DOCUMENTS

| | | | | |
|---|---|---|---|---|
| 6,909,990 B2 * | 6/2005 | Okazaki | ............ | G05B 23/0216 |
| | | | | 702/182 |
| 6,954,713 B2 * | 10/2005 | Eryurek | ............ | G05B 23/0243 |
| | | | | 361/160 |
| 6,975,219 B2 * | 12/2005 | Eryurek | ............... | G05B 23/027 |
| | | | | 340/3.1 |
| 7,103,427 B2 * | 9/2006 | Dillon | ................ | G05B 19/4184 |
| | | | | 345/440 |
| 7,110,833 B2 * | 9/2006 | Nagatsuka | ........... | G05B 19/042 |
| | | | | 700/17 |
| 8,005,647 B2 * | 8/2011 | Armstrong | ......... | G05B 23/0286 |
| | | | | 702/182 |
| 9,201,420 B2 * | 12/2015 | Armstrong | ......... | G05B 23/0218 |

OTHER PUBLICATIONS

J. Wu, Y. Chen, S. Zhou and X. Li, "Online Steady-State Detection for Process Control Using Multiple Change-Point Models and Particle Filters," in IEEE Transactions on Automation Science and Engineering, vol. 13, No. 2, pp. 688-700, Apr. 2016. (Year: 2016).*
Wenzhong, Qu, Sun Jincai, and Qiu Yang. "Active control of vibration using a fuzzy control method." Journal of sound and vibration 275.3-5 (2004): 917-930. (Year: 2004).*

* cited by examiner

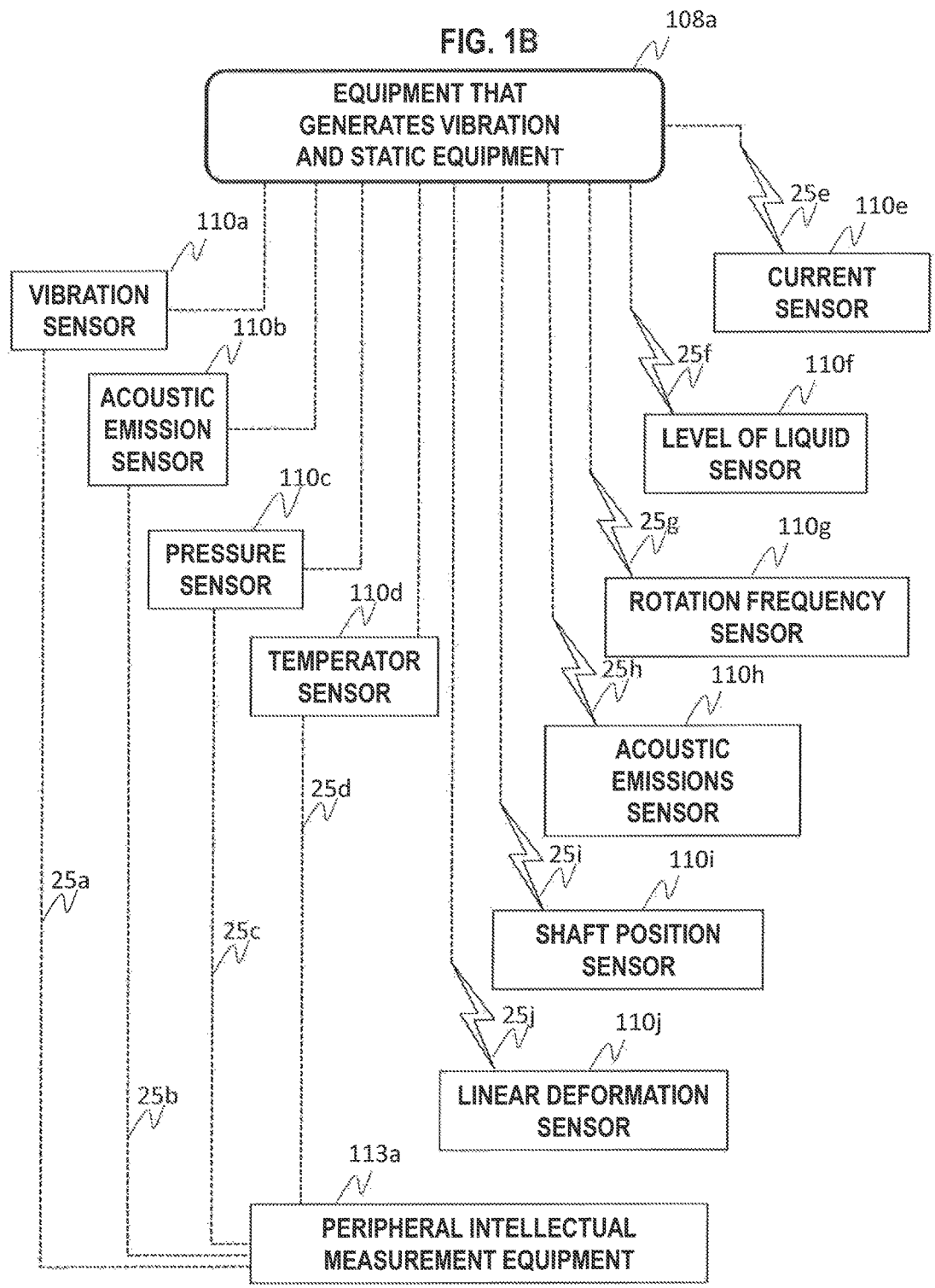

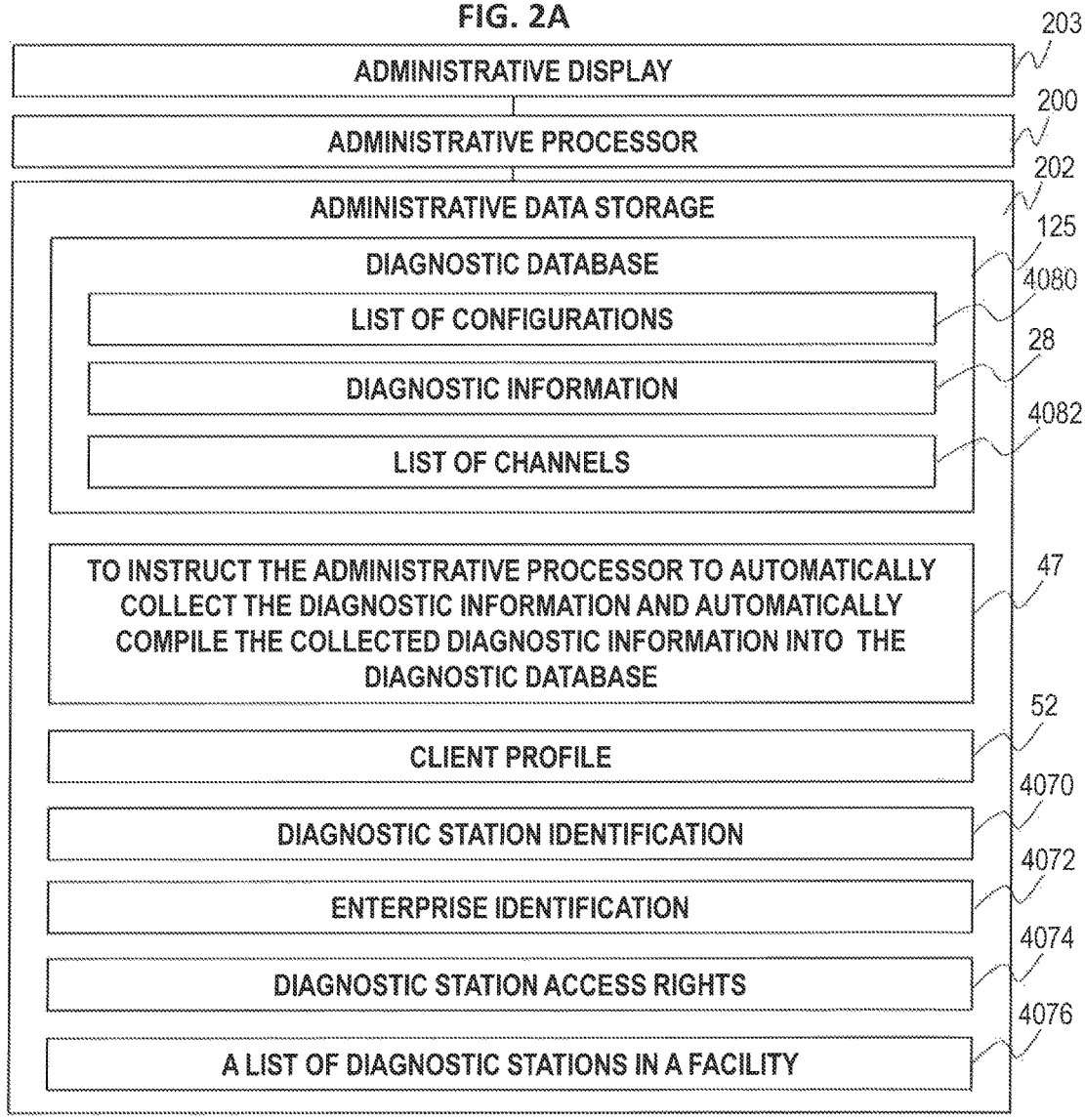

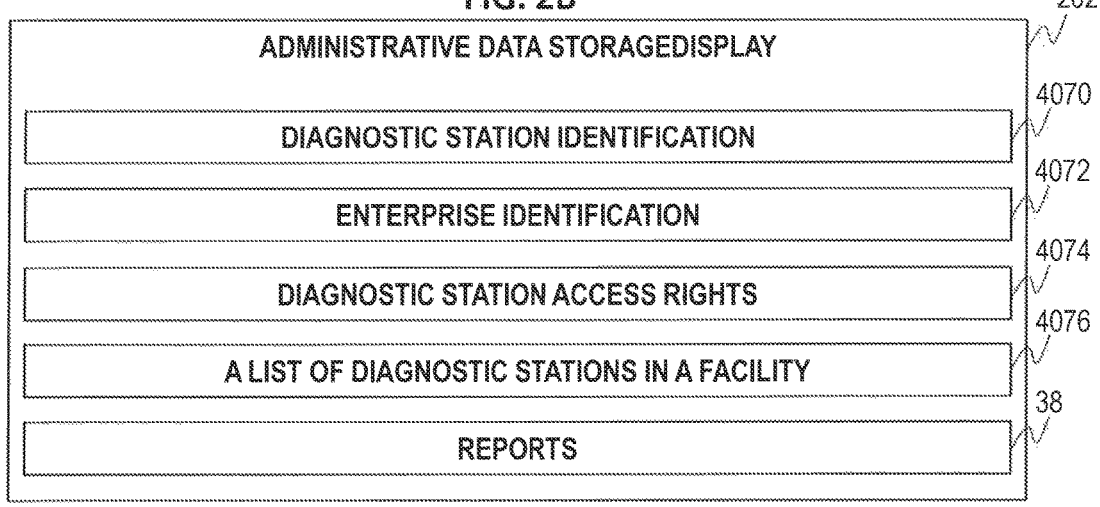

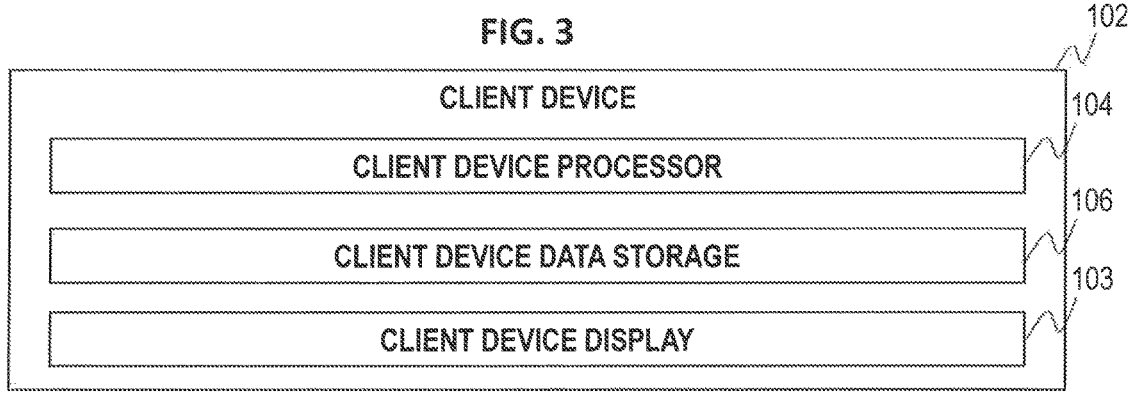

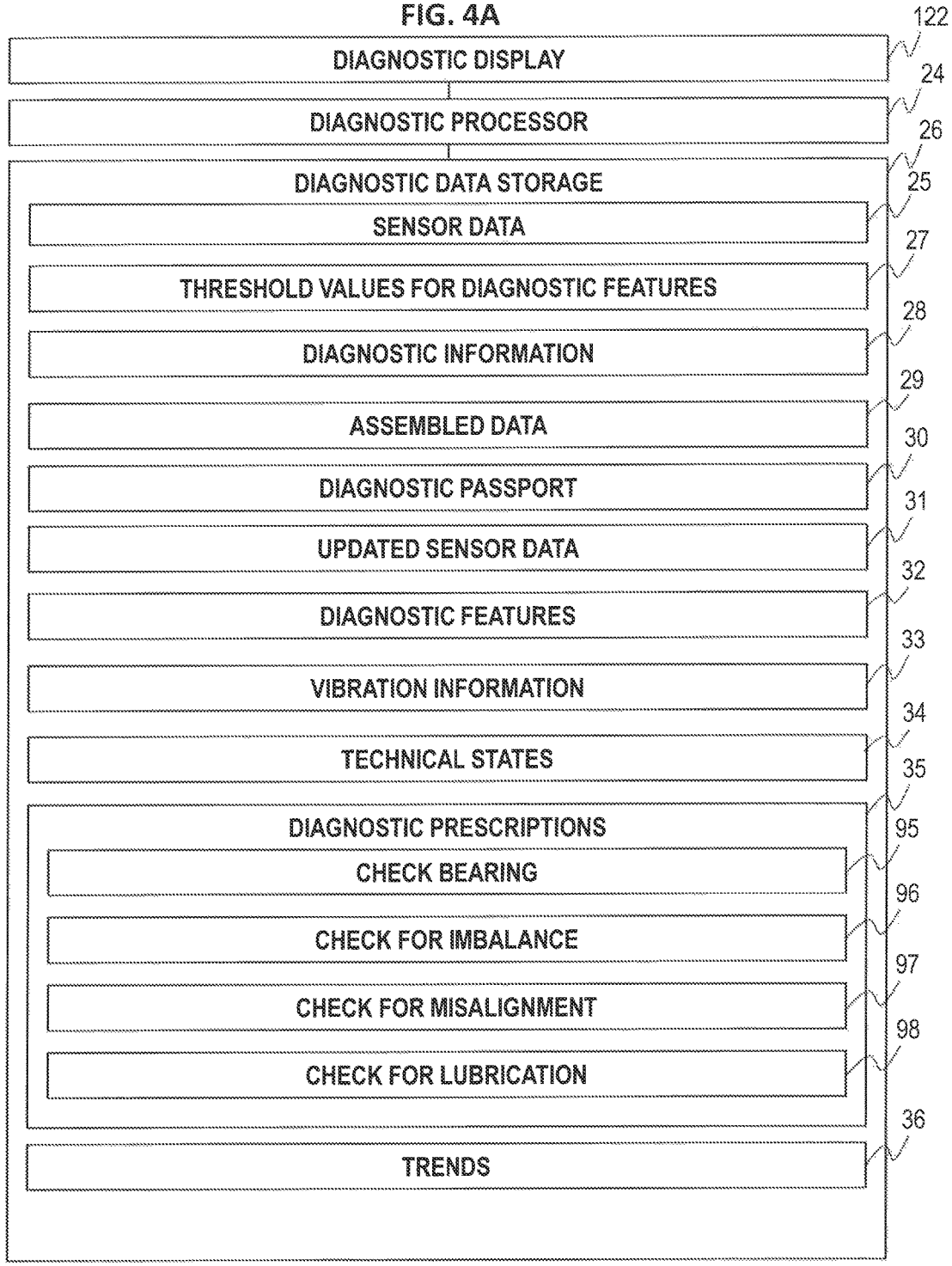

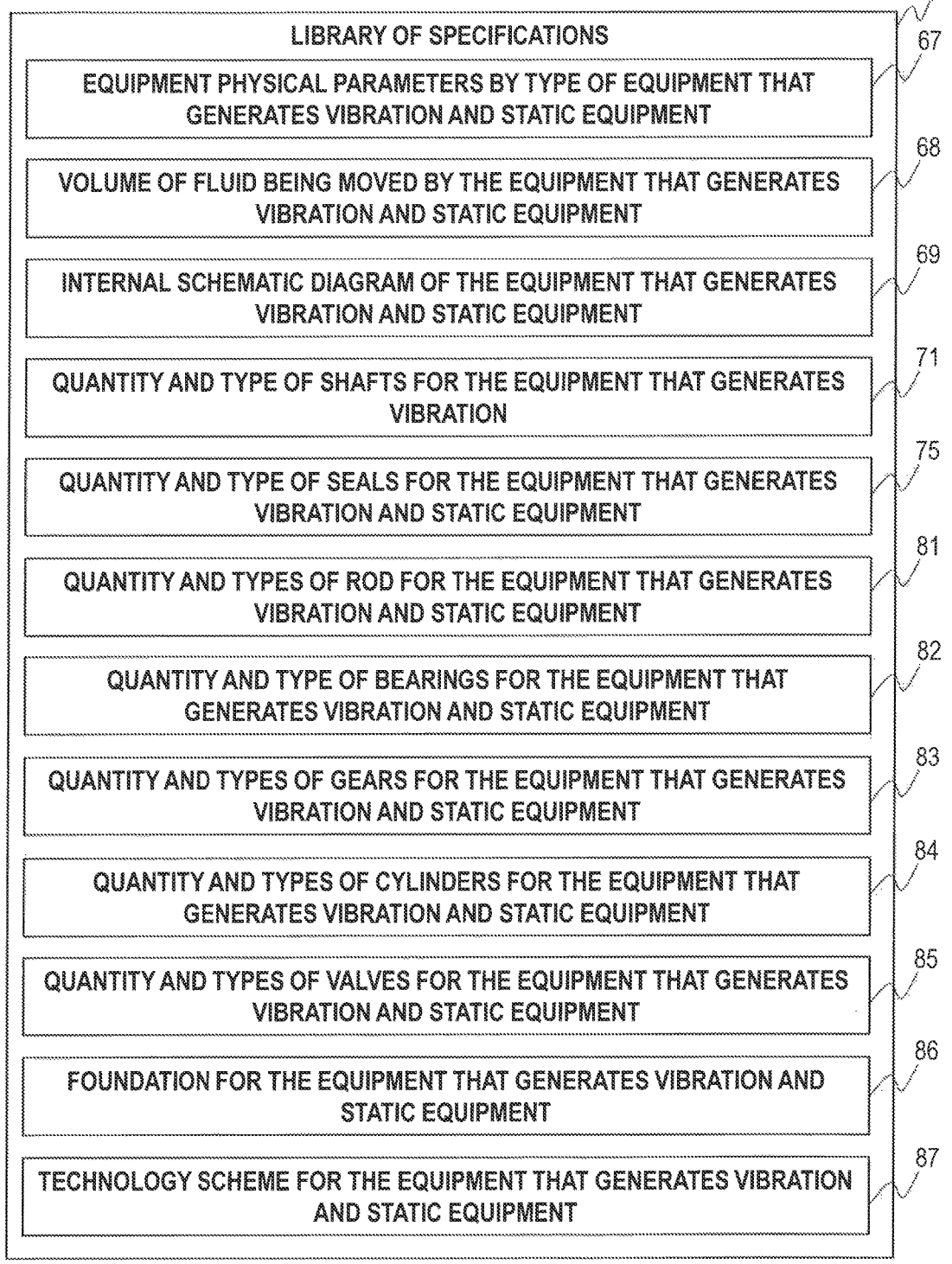

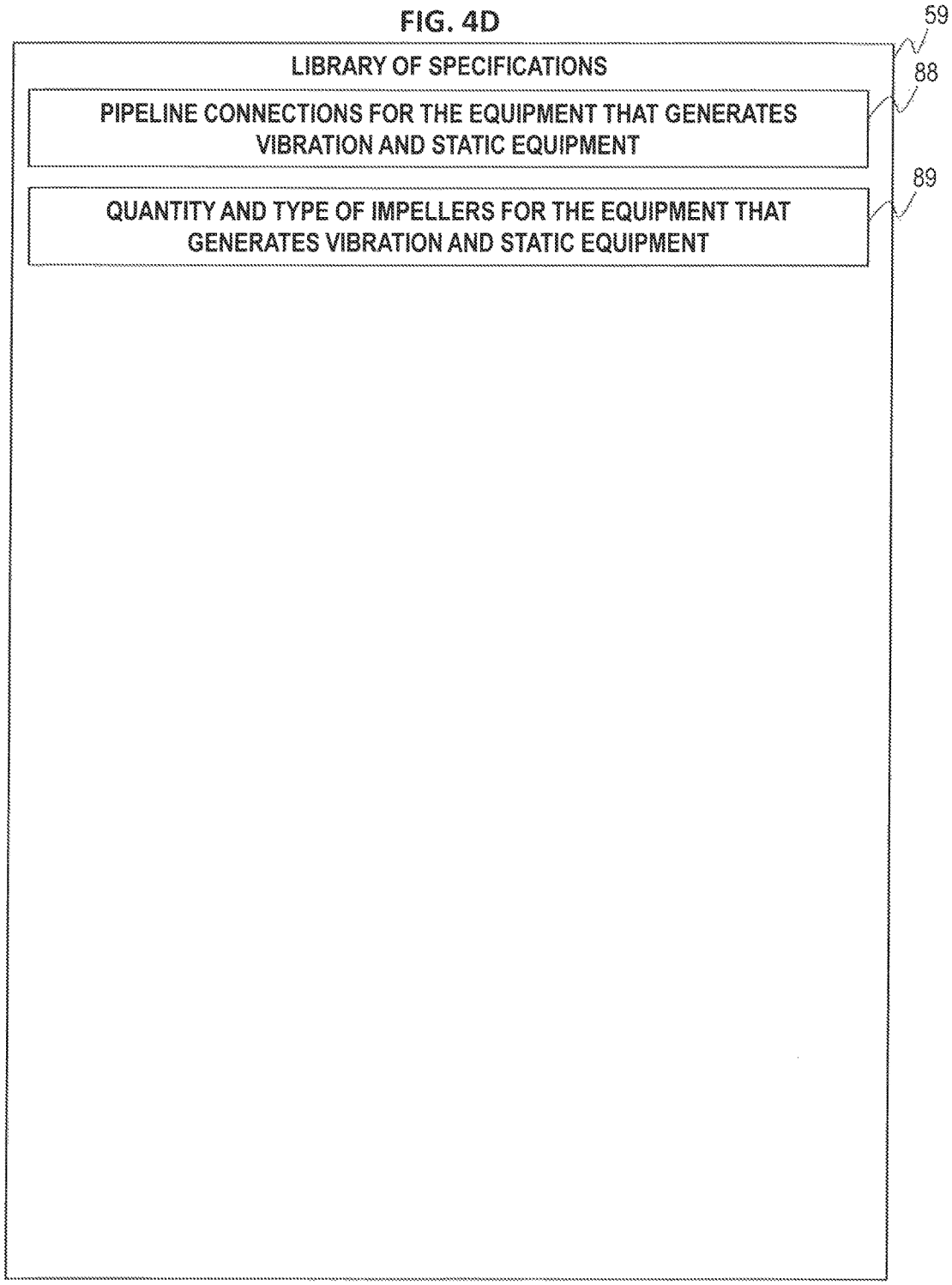

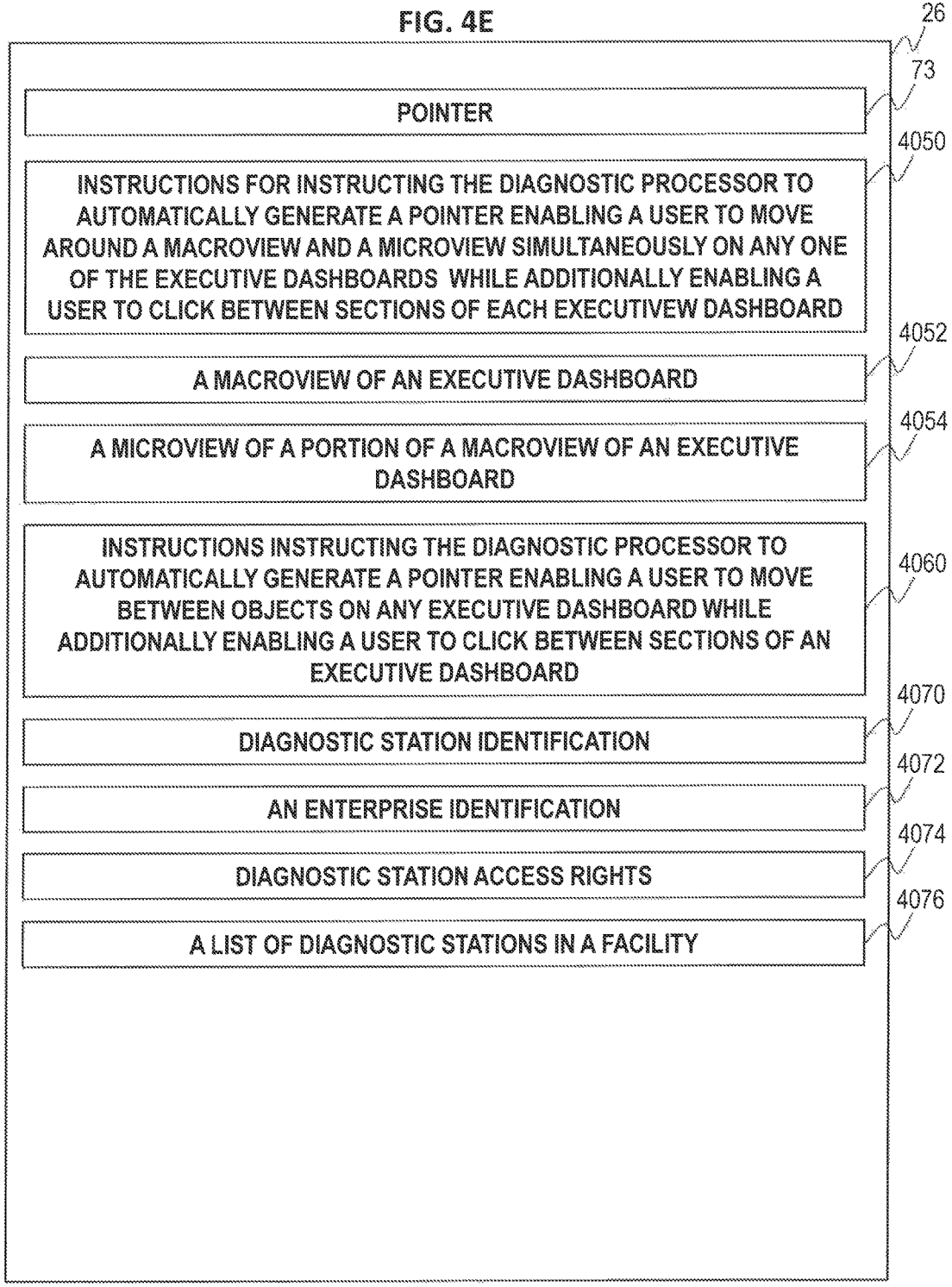

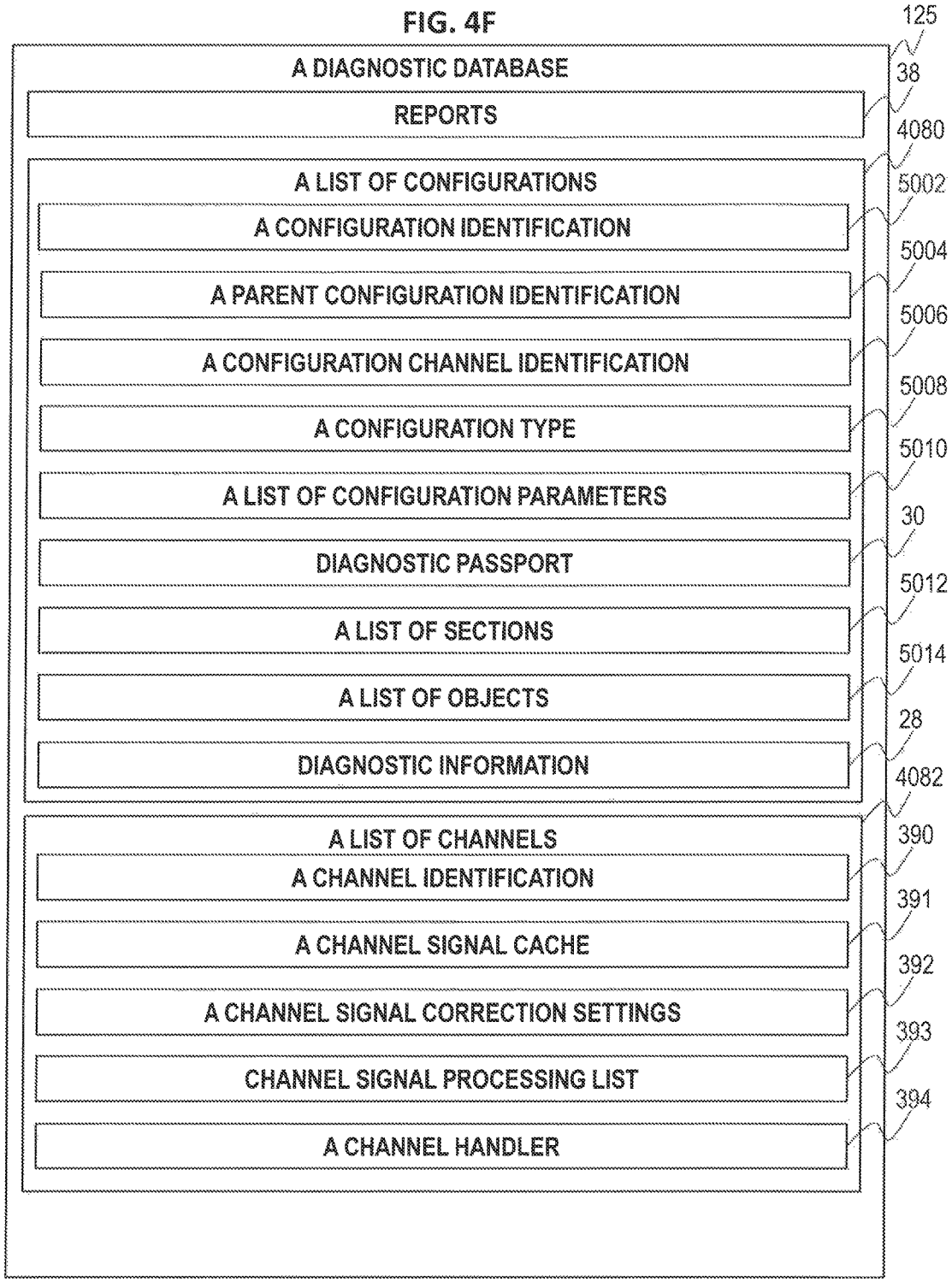

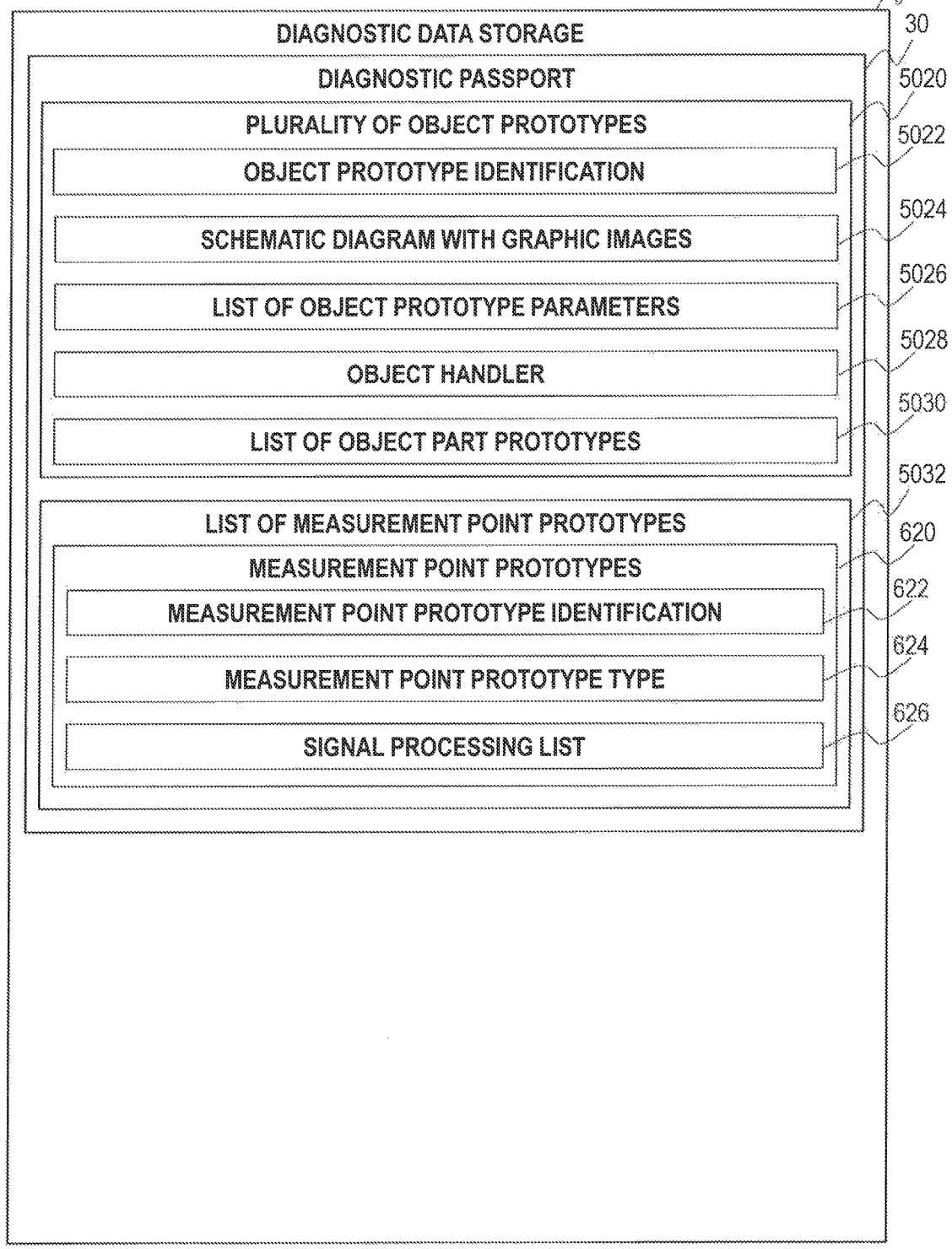

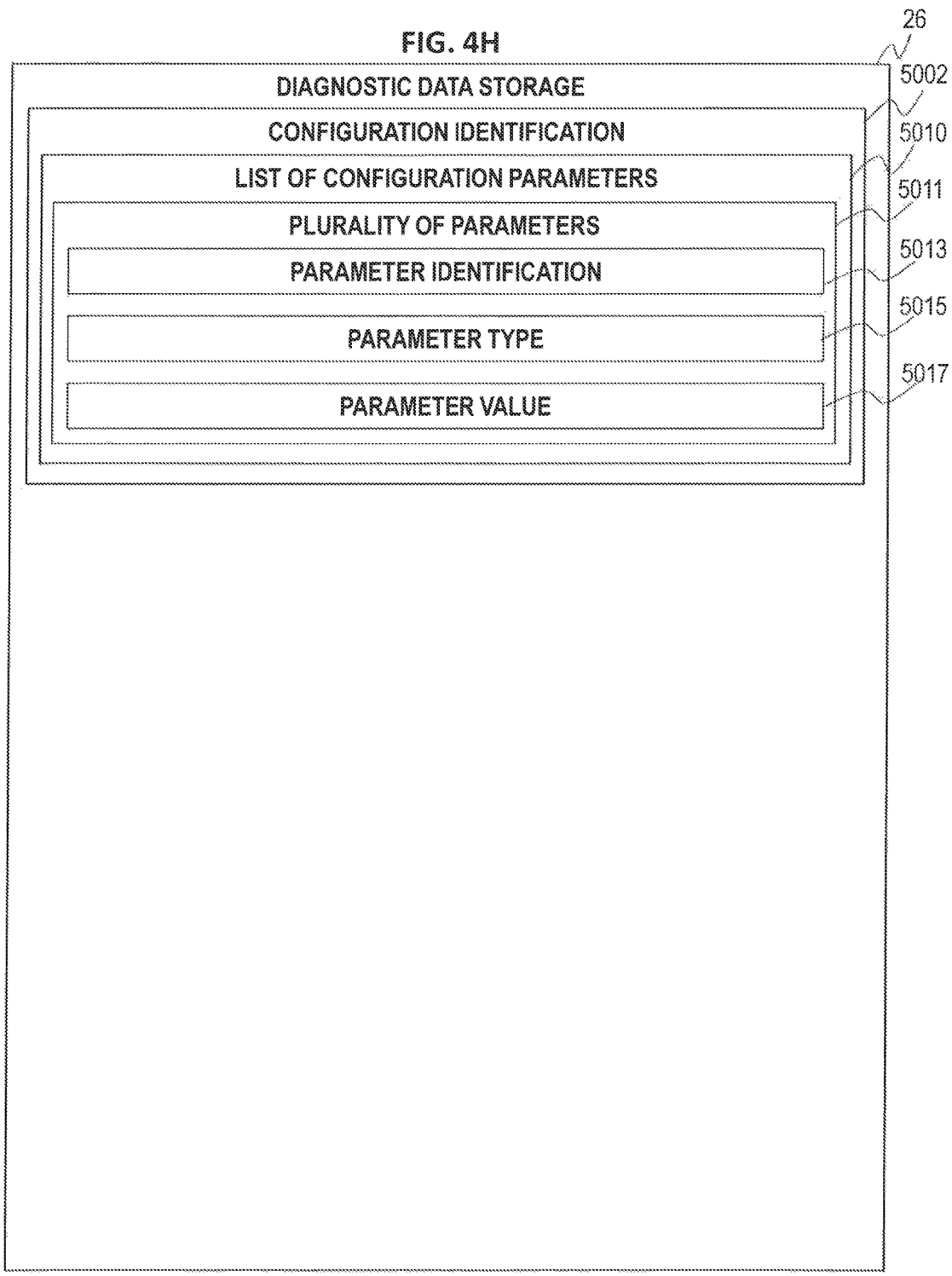

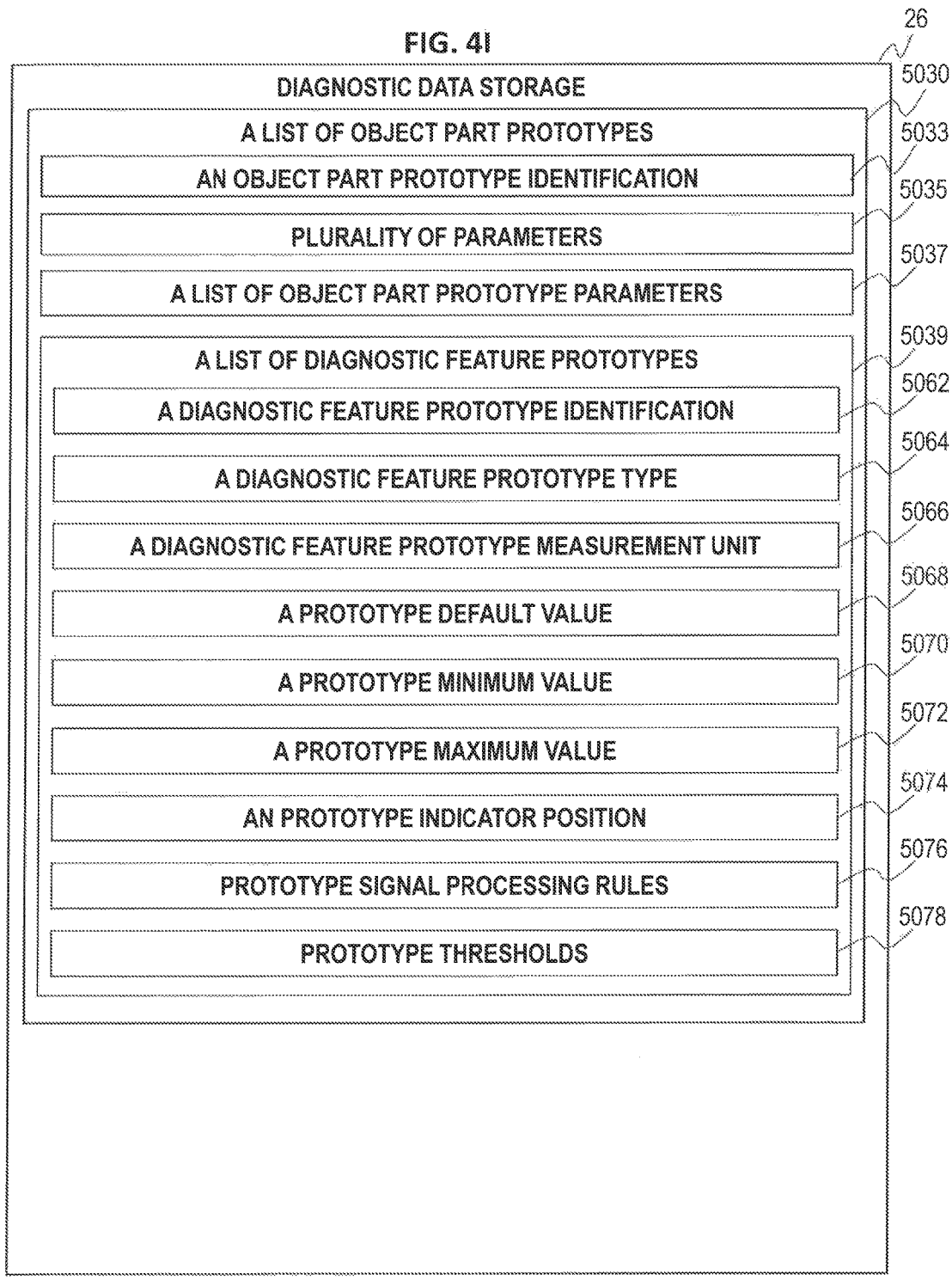

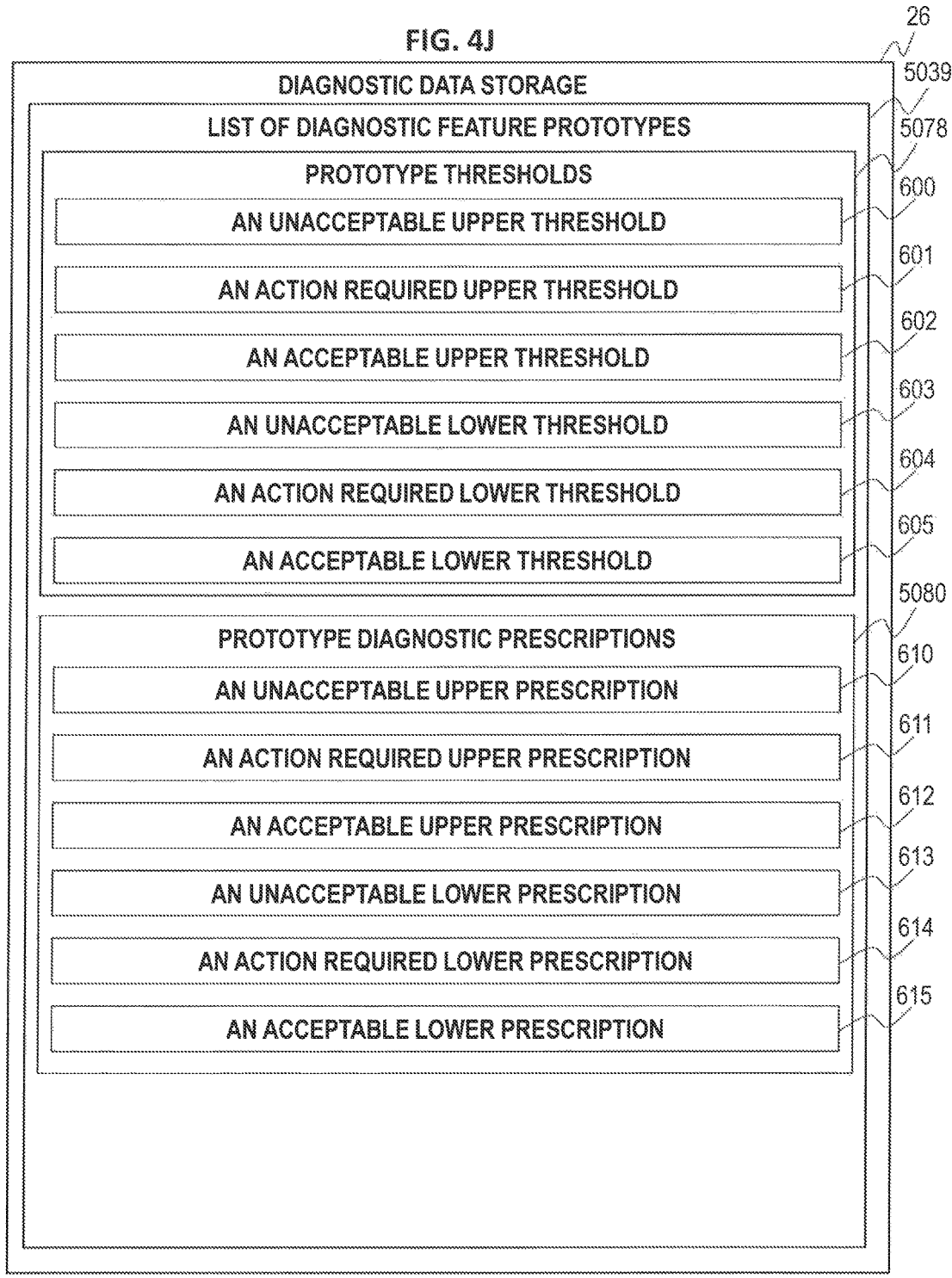

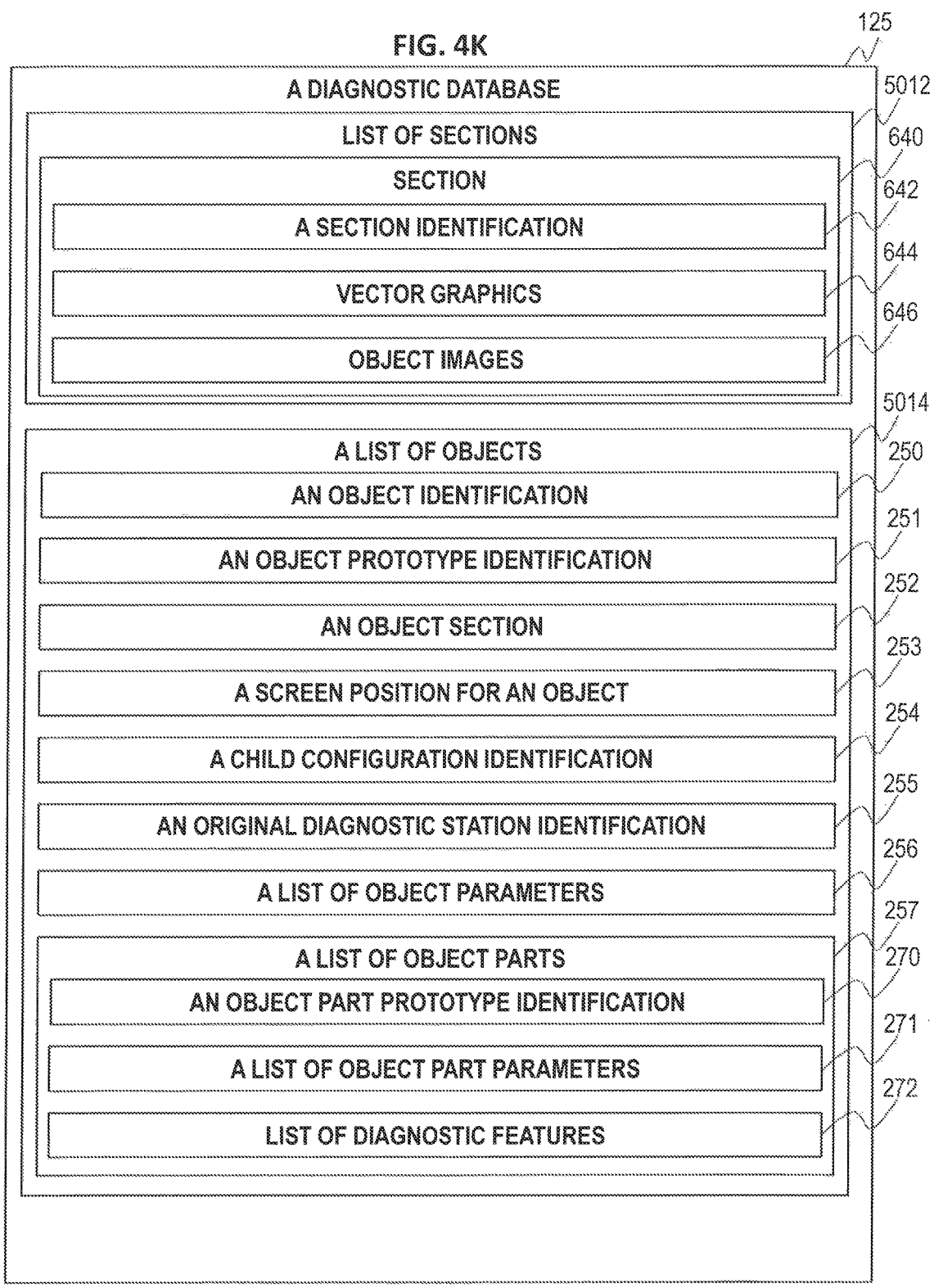

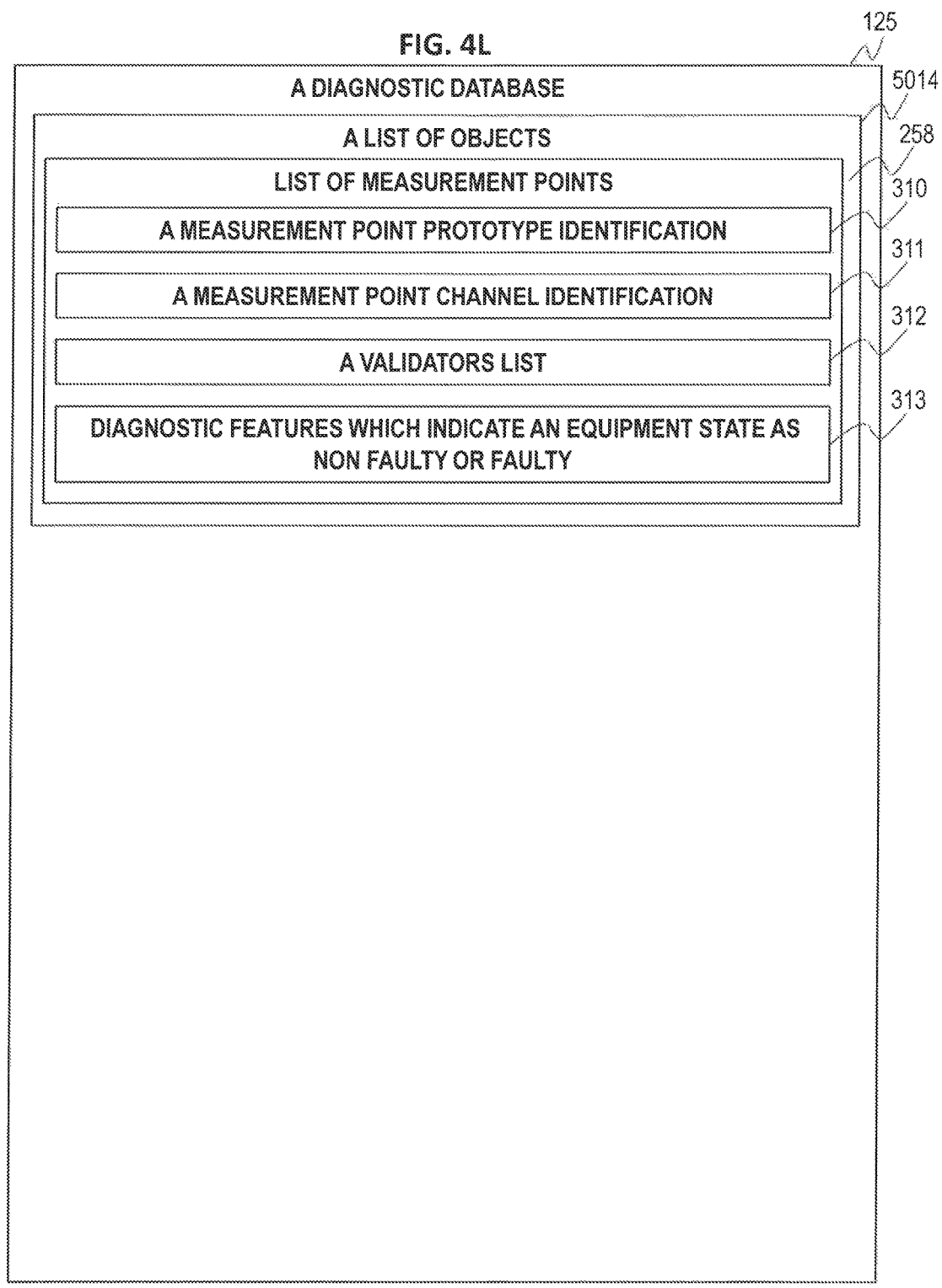

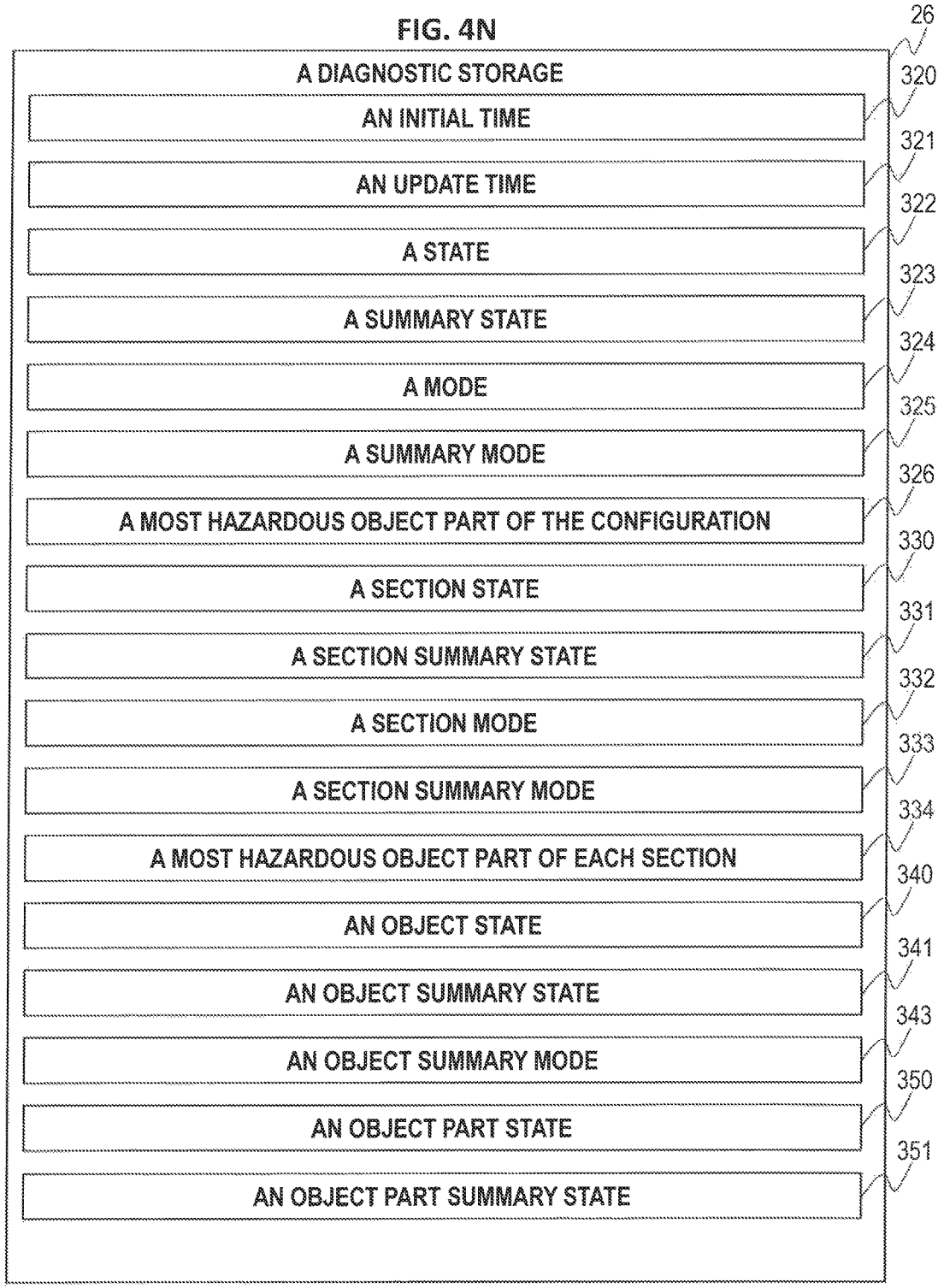

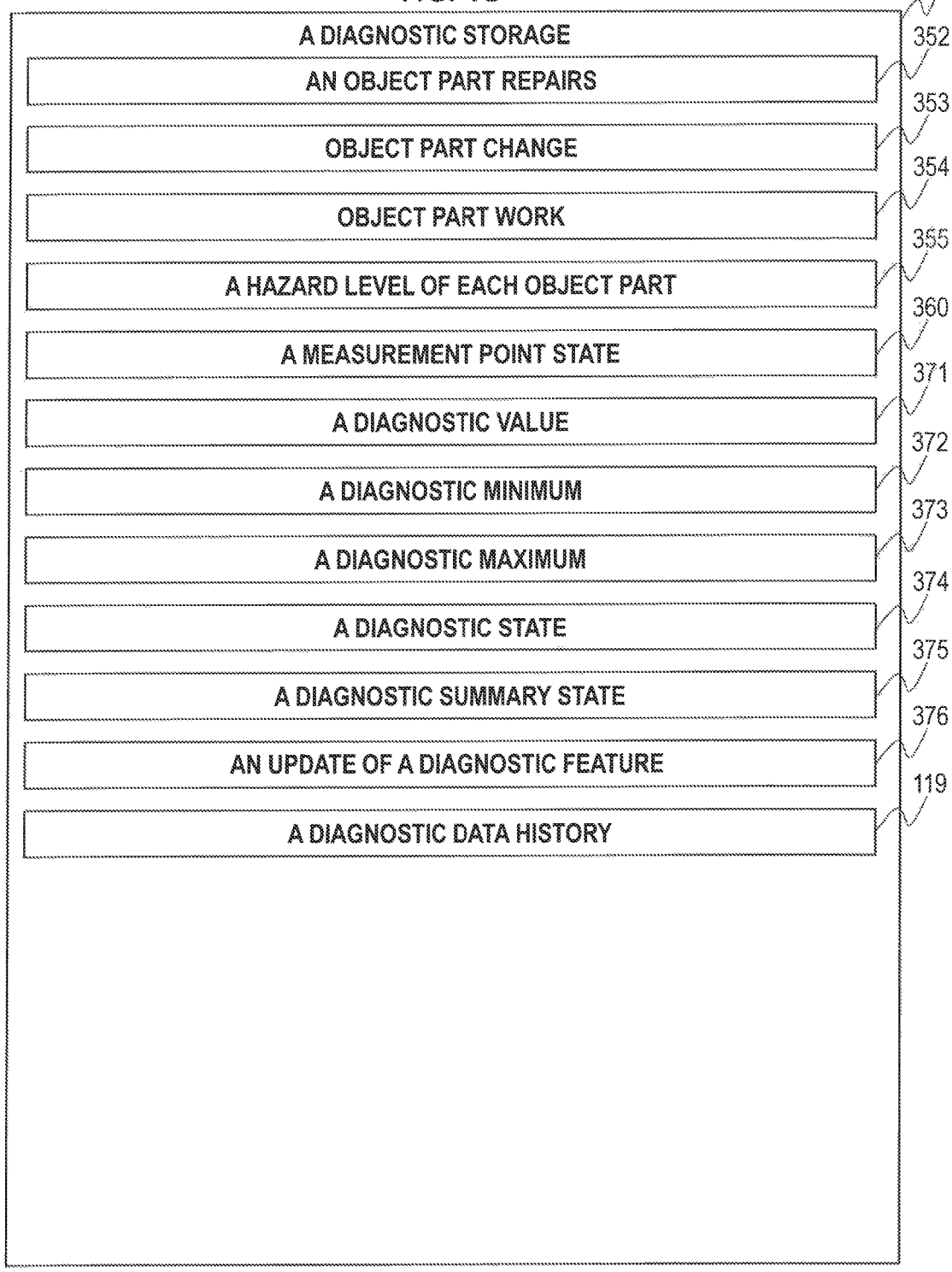

FIG. 5B

PRESENTING SIMULTANEOUSLY FIRST AND SECOND HORIZONTAL THRESHOLDS AND AND A MOVABLE POINTER IN THE AUTOMATIC REAL-TIME DIAGNOSTICS TO DEPICT A PLURALITY OF CHANGING DIAGNOSTIC FEATURES IN TIME RELATIVE TO THRESHOLD LEVELS, PROVIDING INDIATIONS OF SAFE OPERATION AND DEPICTING MAINTENANCE NEEDED FOR THE EQUIPMENT THAT GENERATES VIBRATION

PRESENTING A PLURALITY OF VIRTUAL IMAGES OF THE EQUIPMENT THAT GENERATES VIBRATION AND STATIC EQUIPMENT, EACH VIRTUAL IMAGE WITH A VIRTUAL TAG WITH COMPONENTS, ACH COMPONENT CONNECTED TO A SECTION OF THE QUEIMENT, EACH COMPONENT COLORIZABLE TO INDICATE CONDITION OF OPERATION, EACH VIRTUAL TAG ADDITIONALLY PRESENTING AT LEAST ONE COLORIZED CONDITION TRIANGLE WITHIN THE VIRTUAL TAG, THE COLOR TRIANGLE ORRESPONDING TO A WORST MACHINE CONDITION OF A GROUP OF MACHINES BEFORE STOPPAGE

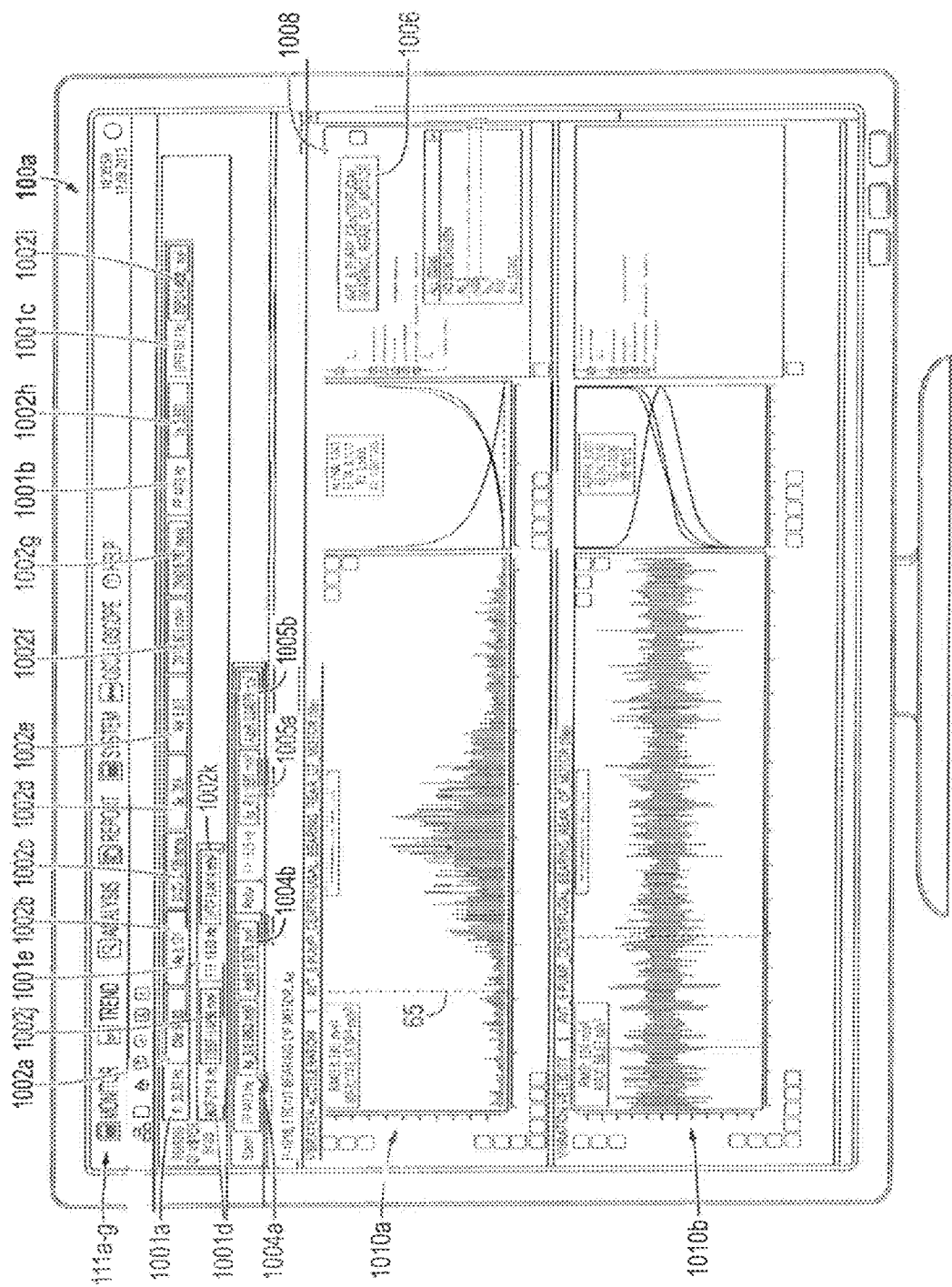

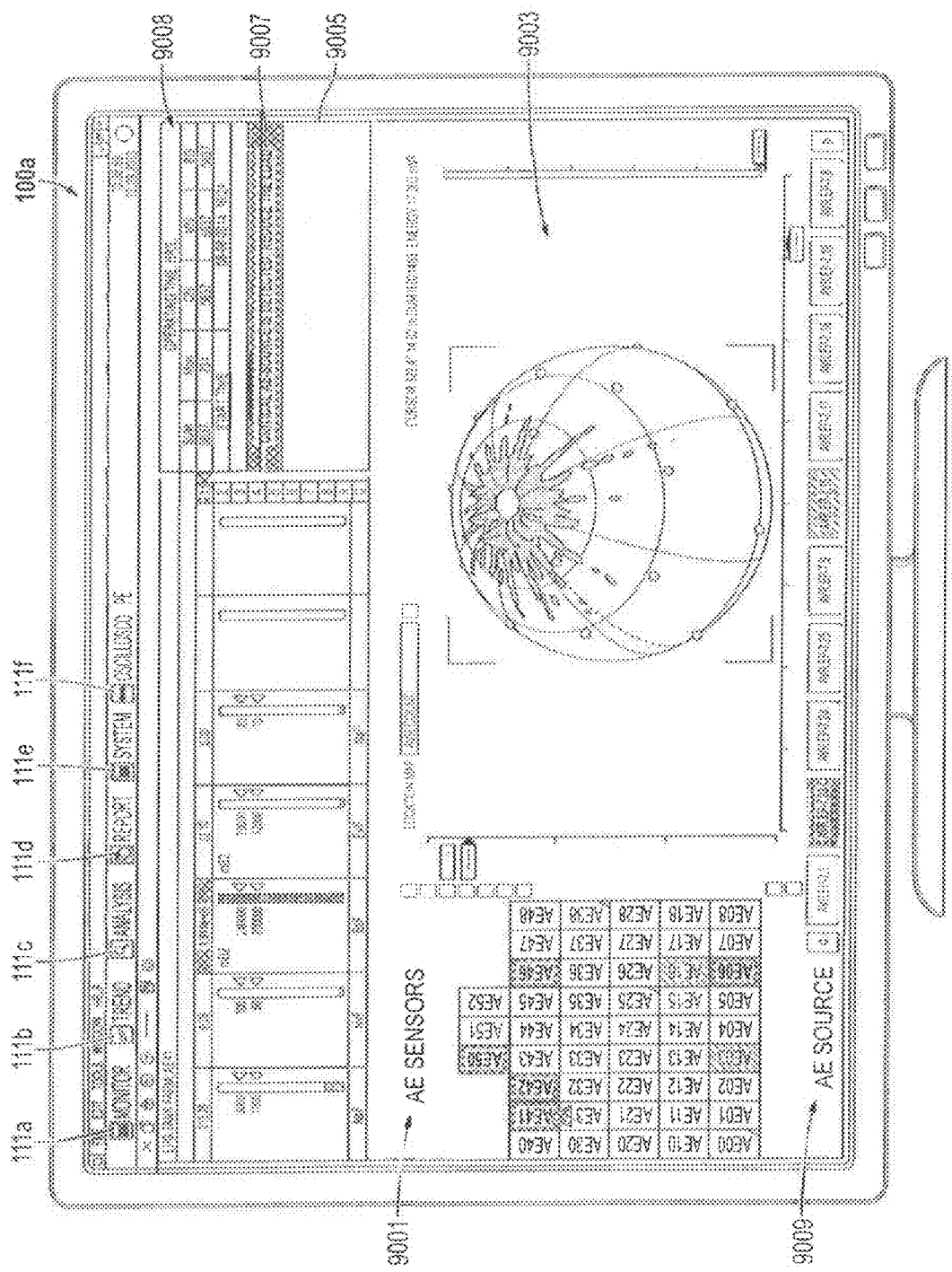

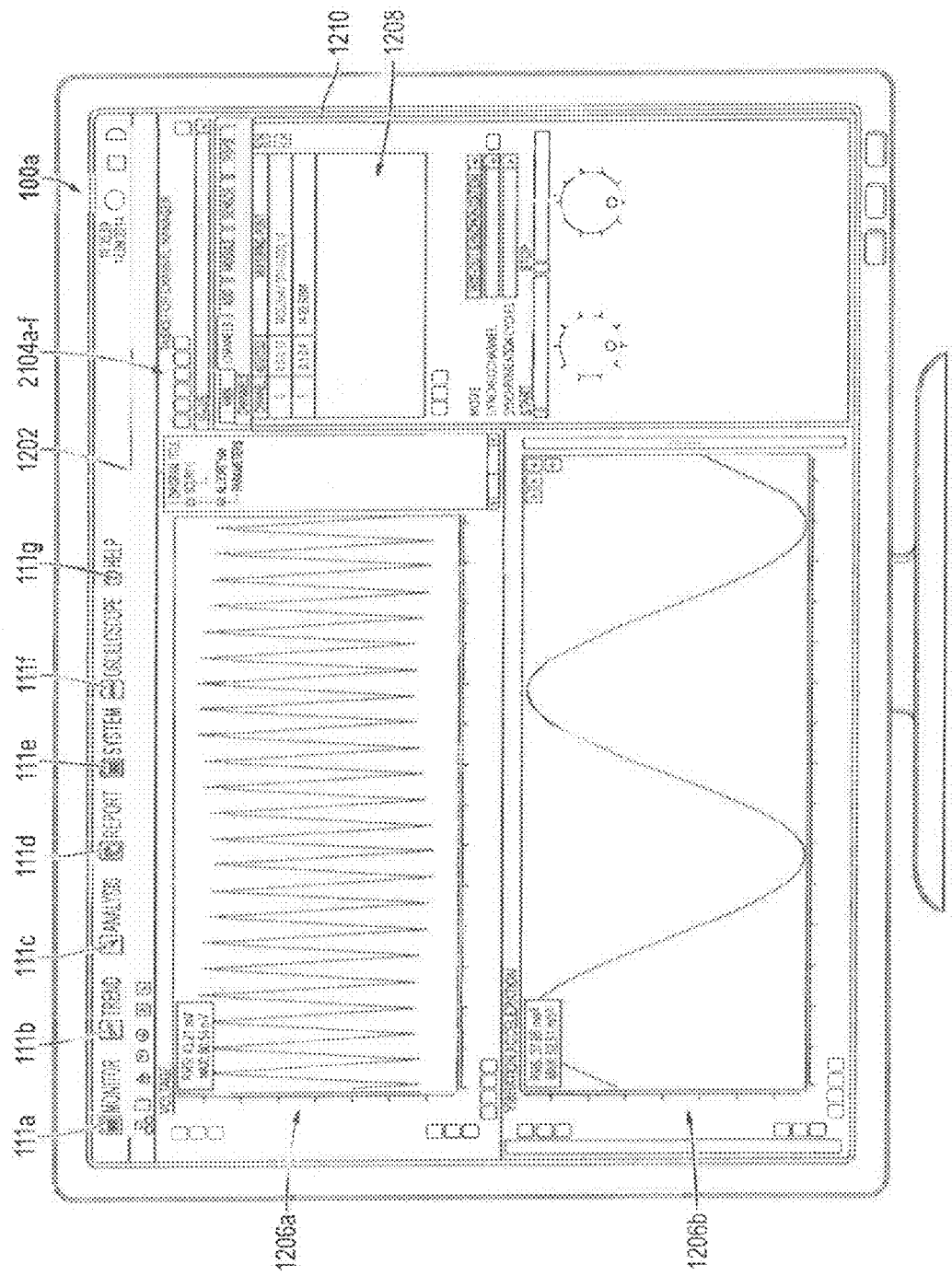

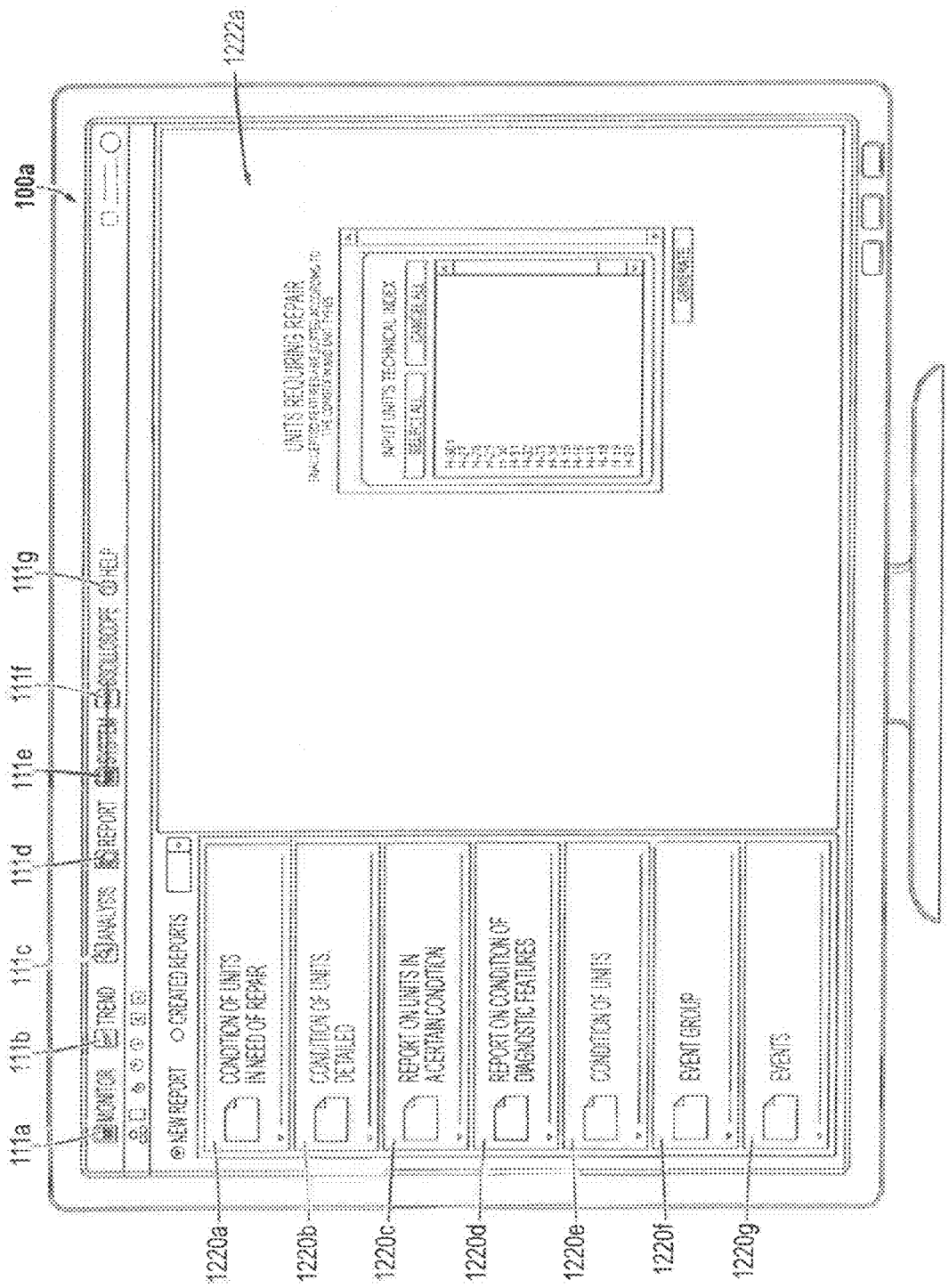

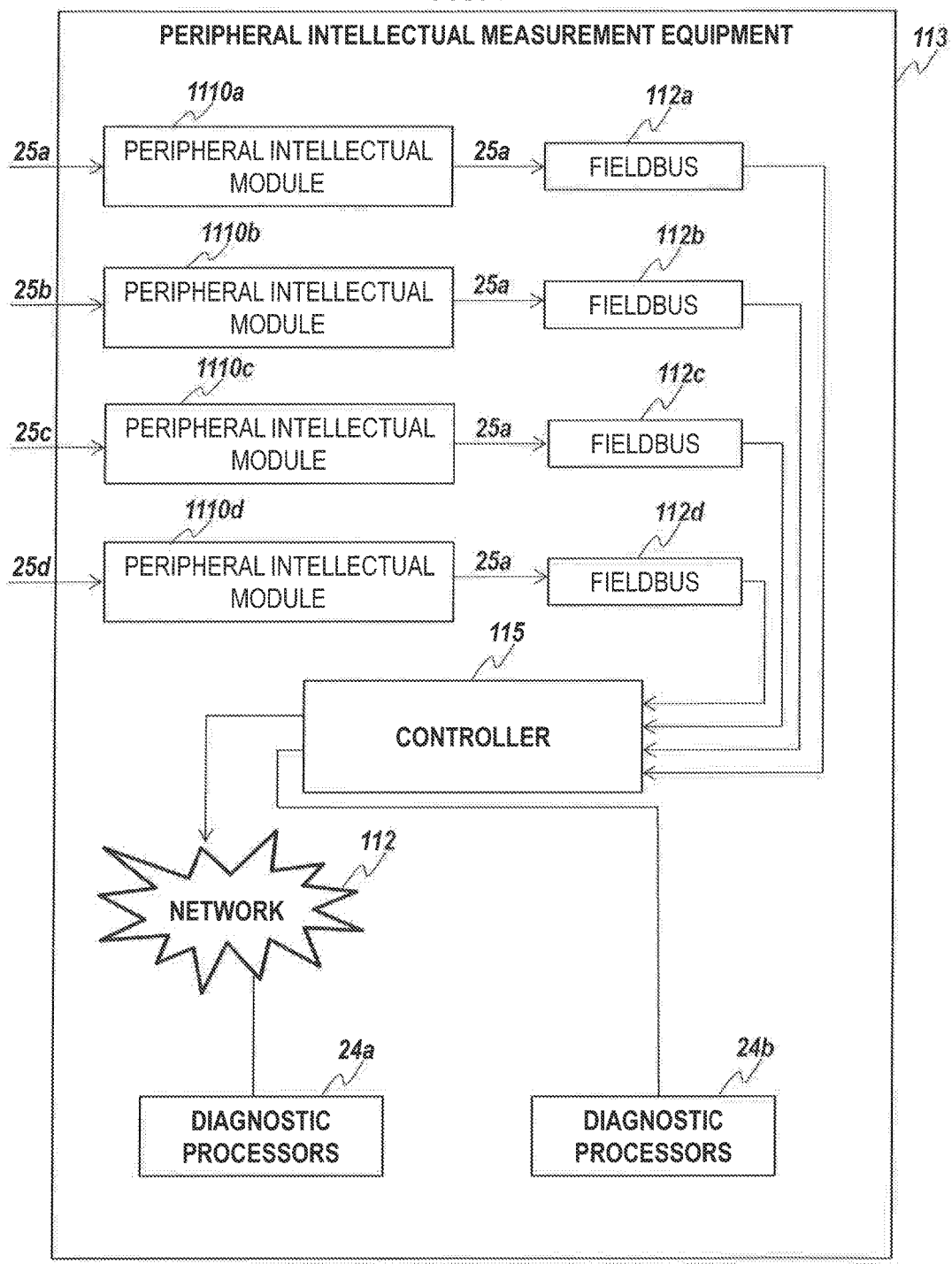

FIG. 8A

A METHOD FOR AUTOMATIC REAL-TIME DIAGNOSTICS

INSTALLING A PLURALITY OF SENSORS ON OR MOUNTED PROXIMATE TO THE EQUIPMENT THAT GENERATES VIBRATION AND STATIC EQUIPMENT, THE PLURALITY OF SENSORS COMPRISING A VIBRATION SENSOR, AND AN ACOUSTIC EMISSION SENSOR, AND AT LEAST ONE OF: A PRESSURE SENSOR, A TEMPERATURE SENSOR, A CURRENT SENSOR, A LEVEL OF LIQUID SENSOR, A ROTATION FREQUENCY SENSOR, ADDITIONAL ACOUSTIC EMISSION SENSORS, A SHAFT POSITION SENSOR, A LINEAR DEFORMATION SENSOR, EACH OF THE PLURALITY OF SENSORS CONFIGURED TO TRANSMIT SENSOR DATA

COLLECTING SENSOR DATA USING AT LEAST ONE PERIPHERAL INTELLECTUAL MEASUREMENT EQUIPMENT (PIM) FROM THE PLURALITY OF SENSORS, PROCESSING THE SENSOR DATA BY REMOVING SIGNAL NOISE OR AVERAGING COLLECTED SENSOR DATA FROM A SENSOR OVER TIME, AND THEN TRANSMITTING THE PROCESSED SENSOR DATA AS ASSEMBLED DATA

RECEIVING SENSOR DATA AND ASSEMBLED DATA USING A PLURALITY OF DIAGNOSTIC STATIONS EACH DIAGNOSTIC STATION WITH A DIAGNOSTIC PROCESSOR IN COMMUNICATION WITH A DIAGNOSTIC DATA STORAGE AND A DIAGNOSTIC DISPLAY AND AN ENTERPRISE NETWORK; EACH DIAGNOSTIC STATION PROCESSOR COMPARING ASSEMBLED DATA TO THRESHOLD VALUES FOR DIAGNOSTIC FEATURES GENERATING DIAGNOSTIC INFORMATION, EACH DIAGNOSTIC PROCESSOR USING A DIAGNOSTIC PASSPORT AND THE ASSEMBLED DATA TO CALCULATE DIAGNOSTIC FEATURES AND CALCULATE TECHNICAL STATES FOR EACH DIAGNOSTIC FEATURE OF ALL OR PORTIONS OF EQUIPMENT THAT GENERATES VIBRATION AND STATIC EQUIPMENT AND GENERATE DIAGNOSTIC PRESCRIPTIONS FOR EACH DIAGNOSTIC FEATURE, THE DATA STORAGE HAVING INSTRUCTIONS TO GENERATE SIMULTANEOUSLY A MONITOR EXECUTIVE DASHBOARD, A TREND EXECUTIVE DASHBOARD, AN ANALYSIS EXECUTIVE DASHBOARD, A REPORT EXECUTIVE DASHBOARD, A SYSTEM EXECUTIVE DASHBOARD, AND AN OSCILLOSCOPE EXECUTIVE DASHBOARD

METHOD FOR AUTOMATIC REAL-TIME DIAGNOSTICS FOR EQUIPMENT THAT GENERATES VIBRATION AND STATIC EQUIPMENT

CROSS REFERENCE TO RELATED APPLICATIONS

The present application claims priority to and the benefit of co-pending U.S. Provisional Patent Application Ser. No. 62/439,864 filed on Dec. 28, 2016, entitled "METHOD FOR AUTOMATIC REAL TIME DIAGNOSTICS FOR EQUIPMENT THAT GENERATES VIBRATION" and co-pending U.S. Provisional Patent Application Ser. No. 62/439,866 filed on Dec. 28, 2016, entitled "SYSTEM FOR AUTOMATIC REAL TIME DIAGNOSTICS FOR EQUIPMENT THAT GENERATES VIBRATION". These references are hereby incorporated in its entirety.

FIELD

The present embodiment generally relates to a method for generating automatic real-time diagnostics for equipment that generates vibration and static equipment.

BACKGROUND

A need exists for a method enabling diagnostics and prognosis of equipment technical states and diagnostic prescriptions to perform maintenance all in real-time for equipments that vibrate at a location including identification of the worse equipment in a group, the worst repair for the worse equipment, all positioned using easy to understand graphics on virtual tags for equipments according to their position in a real facility or a group of real facilities.

The present embodiments meet these needs.

BRIEF DESCRIPTION OF THE DRAWINGS

The detailed description will be better understood in conjunction with the accompanying drawings as follows:

FIGS. 1A-1B depict and embodiment of the system according to one or more embodiments the enable the method to operate.

FIGS. 2A-2B depicts the administrative data storage according to one or more embodiments.

FIG. 3 depicts a usable portable client device according to one or more embodiments.

FIGS. 5A-5B depict an exemplary series of steps to implement the invention according to one or more embodiments.

FIGS. 6A-6H depict the executive dashboards presenting the real-time diagnostics according to one or more embodiments.

FIG. 7 presents the peripheral intellectual measurement equipment according to one or more embodiments.

FIGS. 8A-8C depict a sequence of steps to implement the method.

Figure 1A:
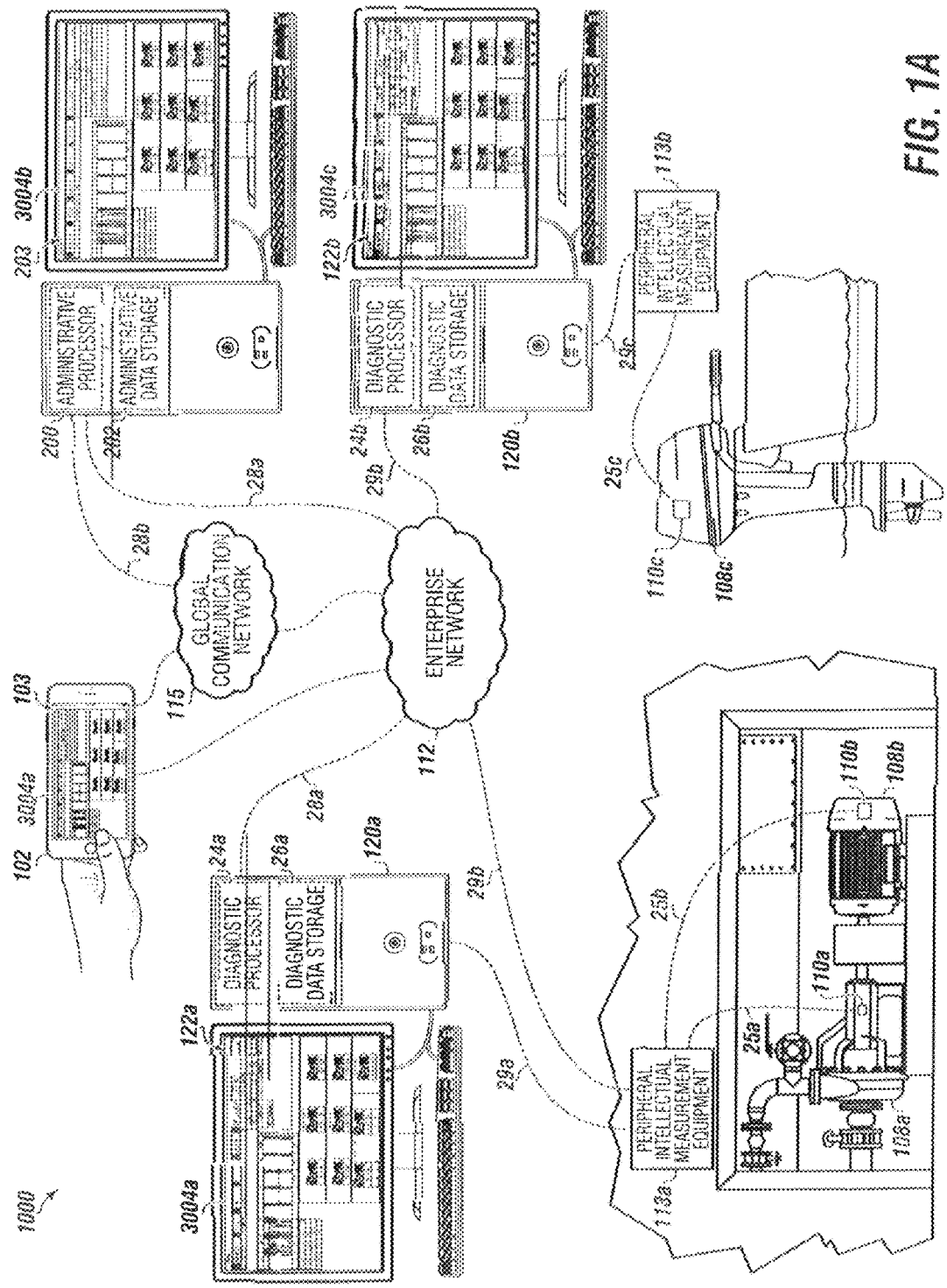
Figure 4B:
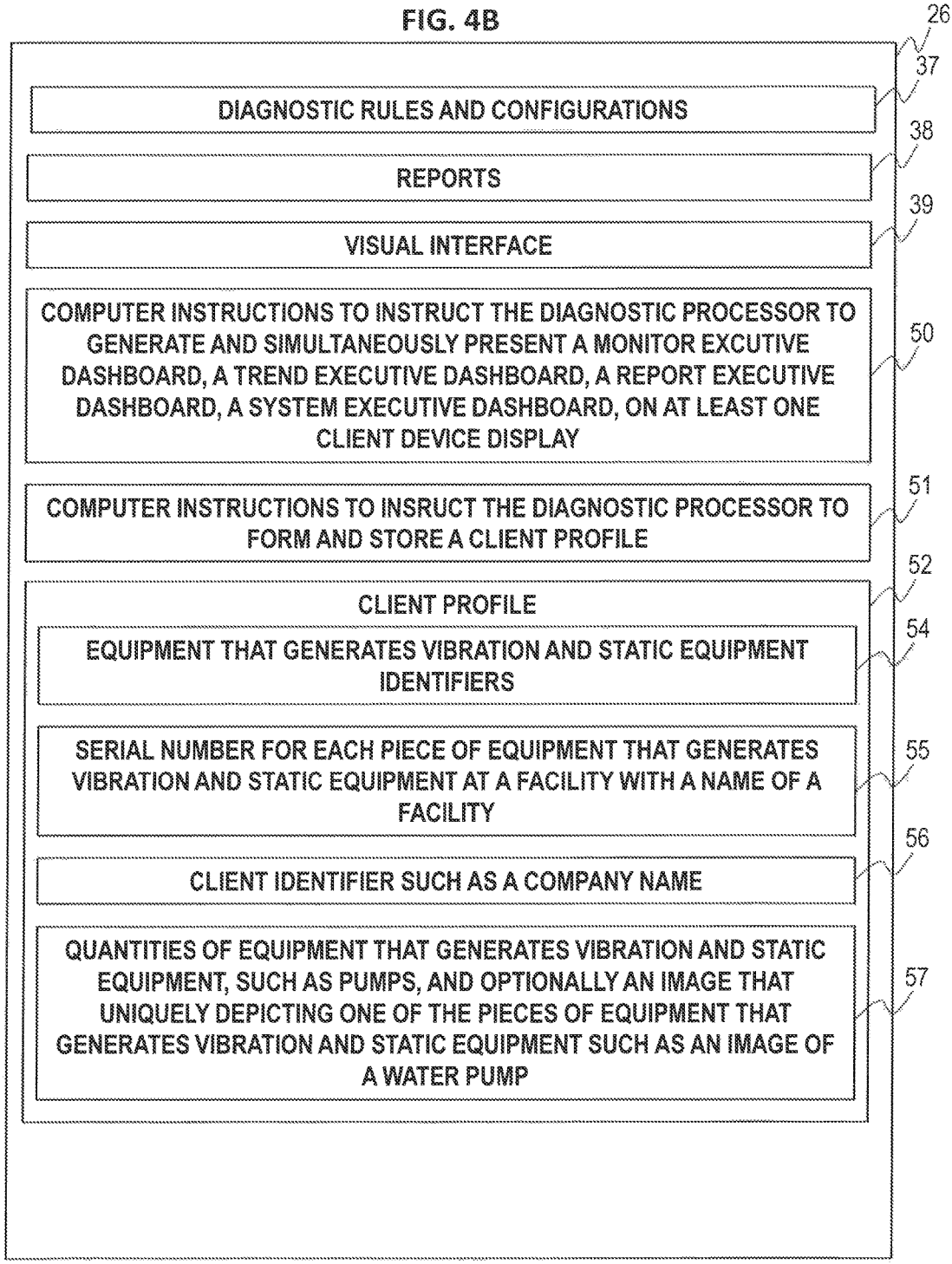
FIGS. 4A-4O depict the diagnostic data storage according to one or more embodiments.
Figure 4M:
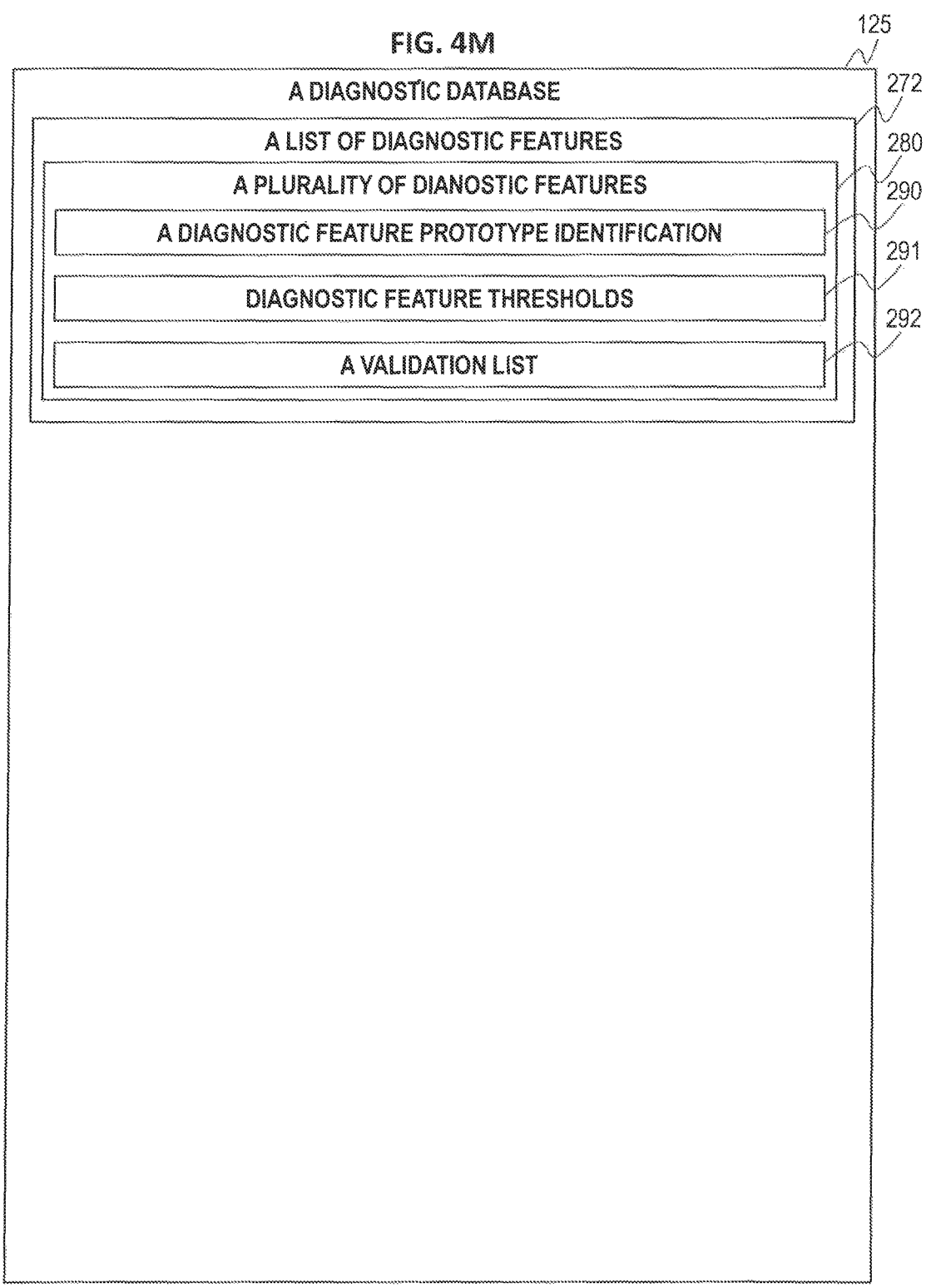

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments relate to a method for generating automatic real-time diagnostics for equipment that generates vibration and static equipment.

The prior art for industrial plant equipmentry management includes (Industrial plant asset management system: apparatus and method, U.S. Pat. No. 6,421,571. Bently Nevada, LLC), which is an automatic system getting real-time operational data and displaying the results through synchronized multi-screen interface.

Also, (U.S. Pat. No. 2,417,393 27, Apr. 2011 FISHER-ROSEMOUNT SYSTEMS, INC.) comprising units collecting data on non-routine situations and systems of the data visualization by means of several screens, which is aimed at prevention of non-routine situations on an industrial plant.

However, the prior art requires great time consumption and has discrepancies in diagnostic control commands issuing because the operator cannot visually cover all parameters of all equipments, to make any decision on their operability.

Additionally, fast determination of equipmentry position in the facility is impossible, due to schematic arrangement of equipments is usually made without considering they actual relative position.

Other prior art includes a method for diagnostics and prognosis of equipmentry technical condition using equipmentry surface vibration (Russian Federation Pat. No. 2103668 3.01.16) wherein schematic arrangement of the equipments is according to their position on a real facility is built on the display screen, diagnostic signals are processed and the data is displayed on the bar graphs of features, equipments and channels are automatically separated for observation, gradation of equipmentry state and system channels are made simultaneously marked them corresponded color, creating required supplementary screens.

Other disadvantages of the prior art include the inability to display larger quantities of equipments and diagnostic features on the screen due to its small scale, the inability to display bigger quantity of diagnostic features due to size limit of features panel, difficulty in quickly determining equipmentry state in the moment of its shutting down, difficulty in quickly determining the exact time of inputting data on commissioned equipmentry specifically repair causes and/or list of repair works, difficulty in quickly determining equipmentry state and diagnostic messages issuing in points of the diagnostic feature trends, difficulty in quickly determining equipmentry position in the facility due to lack of its functional image, difficulty in quickly determine the dynamics of change in a group of features, and time losses for obtaining the information on state of all equipments in the specific moment of time in the past.

The invention is for a method for automatic real-time diagnostics for equipment that generates vibration and static equipment.

The method uses a plurality of sensors installed on or mounted proximate to the equipment that generates vibration and static equipment.

The plurality of sensors include a vibration sensor and an acoustic emission sensor and at least one of: a pressure sensor, a temperature sensor, a current sensor, a level of liquid sensor, a rotation frequency sensor, additional acoustic emission sensors, a shaft position sensor, and a linear deformation sensor.

Each of the plurality of sensors is configured to transmit sensor data on operations of the equipment that generates vibration and static equipment.

The method uses at least one peripheral intellectual measurement equipment (PIM) for collecting sensor data from the plurality of sensors, then processing the sensor data by removing signal noise or averaging collected sensor data from a sensor over time, and then transmitting the processed sensor data as assembled data.

The method uses one or a plurality of diagnostic stations that receive assembled data from the plurality of sensors.

Each diagnostic station has a diagnostic processor in communication with a diagnostic data storage, which can be a computer.

Each diagnostic station has bidirectional communication with an enterprise network.

Each diagnostic station receives the assembled data and compares the assembled data to stored threshold values for a plurality of diagnostic features installed in each diagnostic data storage.

Once the diagnostic station compared the assembled data to the stored threshold values, the processor of the diagnostic station generates diagnostic information.

Each diagnostic station has instructions in the diagnostic data storage to instruct the diagnostic processor to use a diagnostic passport and the assembled data and calculate diagnostic features, calculate technical states for each diagnostic feature for all or portions of equipment that generates vibration and static equipment using the threshold values.

Each diagnostic station uses the diagnostic features to generate diagnostic prescriptions for each threshold value of each diagnostic feature.

More specifically, the diagnostic station has instructions in the diagnostic data storage so the diagnostic processor provides diagnostic information simultaneously as a Monitor Executive dashboard, a Trend Executive Dashboard, an Analysis Executive Dashboard, a Report Executive Dashboard, a System Executive Dashboard, and an Oscilloscope Executive Dashboard.

More specifically, in the method, the Monitor Executive Dashboard automatically uses the assembled data to generate diagnostic data simultaneously for: (i) portions of equipment in a facility, (ii) individual equipment in a facility, (iii) groups of equipment in a facility, and (iv) all equipment in a facility as a visual presentation: for monitoring by worst operating condition at least one of: the portions of equipment in the facility, the individual equipment in the facility; the groups of equipment in the facility, and all equipment in the facility.

In the method, the Trend Executive Dashboard automatically compares diagnostic data to threshold values for diagnostic features and generates trends as a visual presentation.

The method's Analysis Executive Dashboard automatically presents assembled data as a visual presentation of signals.

The visual presentation of signals is a visual presentation of a variety of data forms used by diagnostic rules and configurations in the diagnostic data store. The data forms include spectra, cepstrums, and wavelets, among others.

The Analysis Executive Dashboard automatically and simultaneously with the presentation visually of the data forms used by diagnostic rules and configurations (a) calculates each diagnostic feature and (b) creates and edits diagnostic rules and configurations stored in the diagnostic data storage.

The method uses a Report Executive Dashboard that automatically generates multiple reports using the diagnostic information and preset user requests. The Report executive dashboard is configured to also automatically generate multiple reports using the diagnostic information according to a preset schedule for maintenance of equipment that produces vibration and static equipment.

The method uses a System Executive Dashboard that automatically generates a visual interface enabling monitoring, configuration and control of the plurality of peripheral intelligent measurement equipment, the plurality of diagnostic stations and the plurality of sensors.

The method includes an Oscilloscope Executive Dashboard that automatically generates a visual interface with a visual signal diagram of sensor data, a visual signal diagram of operation parameters for channels, a visual signal diagram of operational parameters for peripheral intellectual measurement equipment, with synchronization in real time, when sensor data changes.

The method uses an administrative processor with administrative data storage, that can be a computer or a cloud based processing system.

The administrative processor communicates with the plurality of diagnostic stations through an enterprise network, a global communication network, or combinations of these networks.

The administrative processor is configured to automatically collect the diagnostic information, and automatically compile the collected diagnostic information into an interactive a diagnostic database.

The method uses at least one client device which has a client device processor, a client device data storage, and a client device display, such as a smart phone, or table computer, that additionally provides bidirectional communication with the plurality of diagnostic stations and the administrative processor.

Each client device presents the diagnostic information by each of the generated Monitor, Trend, Analysis, Report, System and Oscilloscope executive dashboards on demand, and synchronously for viewing by a user.

The method automatically generates real time diagnostic information from assembled data as a composite visualization of equipment (equipment producing vibration and static equipment) in a facility by (i) portions of equipment in a facility, (ii) individual equipment in a facility, (iii) groups of equipment in a facility, and (iv) all equipment in a facility with the Monitor, Trend, Analysis, Report, System and Oscilloscope executive dashboards.

The method enables a visualization of user selected diagnostic features, user selected trends, identification of equipment that generates vibration and static equipment, operational parameters enabling prediction of maintenance events associated with equipment that generates vibration and static equipment, while the method presents the equipment that generates vibration as virtual images, with each virtual image having at least one virtual tag representing diagnostic information enabling simultaneous and automatic real time diagnostic analysis, real time equipment trend updating, proposed maintenance schedules, and real time viewing of maintenance activities on at least one portion of equipment that generates vibration and static equipment.

The following terms are used herein:

The term "analysis" as used herein can refer to prognosis of equipmentry technical states and provides suggested technical action to take, such as a prescription for repair and maintenance of a piece of equipment.

The term "averaging collected sensor data" refers to a total volume of sensor signals from a given sensor divided by a preset unit of time.

The term "correction model" as used herein can refer to a model created after the diagnostic station receives signal and makes prescription as to what must happen to increase the equipment operating time.

The term "diagnostic passport" as used herein can refer to an expert model with multiple physical parameters for use in generating diagnostics in real-time, configured for continuous updating of the comparison of sensor data to known specifications.

The term "enterprise network" refers a network connecting to the diagnostic station which is adapted for handling for example, to 16 peripheral intellectual measurement equipments, each peripheral intellectual measurement equipment configured to handle 8 analog sensor and 16 digital sensors.

The term "monitor" as used herein can refer to a screen for presenting values of large quantity of diagnostic features. The monitor can present the values in the form of bar graphs. The monitor screen can generate multiple symbols in which each symbols represent a piece of equipment. The monitor screen can present the graphic symbol of the equipment with a rectangular area proximate the symbol. The rectangular area has an area of triangular graphic symbols wherein the triangle location represents a diagnostic feature. The monitor can include operation speed, the worst equipmentry condition in a group of equipments, the worst operating equipment in a group of equipments, and a quantity of equipments in a facility.

The term "moveable macro/micro diagnostic feature trends device" as used herein can refer to The term "peripheral intellectual measurement equipment" refers to a module with a processor and data storage for receiving and transmitting sensor data to the enterprise local area network.

The term "real-time" as used herein can refer to a window of time that starts on a date that a problem originates and terminates when the problem became an unavoidable failure.

The term "real-time diagnostics" as used herein can refer to the graph or message output by a diagnostic processor of an error or state of equipment that generates vibration and static equipment in a particular location in real-time.

The term "signal noise" refers to signals that general "noise" as a random fluctuation in an electrical signal.

The term "trend" as used herein can refer to diagnostic feature trends with trend lines, bar graphs, and threshold values of diagnostic feature. The trend screen may use the word "UNACCEPTABLE" in red to indicate that equipment is trending to an inoperable condition quickly. Yellow color can be used slower trend towards an operable state for the equipment that generates vibration and static equipment. The trend screen may include a column suggesting "ACTIONS NEEDED OR ACTIONS REQUIRED" for a given piece of equipment.

The term "report" as used herein can refer to output of real-time diagnostics by date and time code.

The term "oscilloscope" as used herein can refer to a piece of equipment that measures voltage and can show faulty measuring channels for a piece of equipment with a graphic symbol.

Turning now to the Figures, FIGS. 1A-1B depict the system 1000 according to one or more embodiments that enables the method to be performed.

FIG. 1A shows a plurality of sensors are installed on or mounted proximate to the equipment that generates vibration and static equipment 108a, b, and c.

FIG. 1B shows the plurality of sensors for the equipment that generates vibration and static equipment 108a as being a vibration sensor 110a and an acoustic emission sensor 110b, and at least one of: a pressure sensor 110c, a temperature sensor 110d, a current sensor 110e, a level of liquid sensor 110f, a rotation frequency sensor 110g, an additional acoustic emission sensor 110h, a shaft position sensor 110i, a linear deformation sensor 110j. Example sensors can be made by Dynamics located at Omsk in Russia or United States.

Each of the plurality of is configured to transmit sensor data 25a-j respectively to a peripheral intellectual measurement equipment 113a that transmits data. An example of sensor data for static equipment is acoustic signal wave forms.

FIGS. 1A and 1B shows that each sensor communicates with a peripheral intellectual measurement equipment (PIM) 113a and 113b in a wired or wireless manner or combinations thereof.

The sensors are depicted as receiving the information from the equipment that generators vibration and static equipment in a wireless or wired mode.

Returning specifically to FIG. 1A, the sensors 110a-110c can be mounted proximate to the equipment that generates vibration and static equipment 108a-108b in a wireless connection, (shown in FIG. 1B) or a wired connection.

In an embodiment, the sensors can be 1 to 10 inches apart from the equipment that generates vibration and static equipment.

The equipment that generates vibration and static equipment 108a-108c can be a pump, a motor, or another rotating device or static equipment.

Each peripheral intellectual measurement equipment can be miles from the equipment generating vibration or can be proximate to (within a few feet) or mounted onto at least one piece of the equipment that generates vibration and static equipment.

Each peripheral intellectual measurement equipment (PIM) 113a, and 113b processes the sensor data 25a, 25b and 25c are shown by removing signal noise or averaging collected sensor data from one or more sensors over a preset unit of time, and then transmitting the signal with noise removed or transmitting averaged collected sensor data as assembled data 29a, 29b, 29c to a diagnostic processor 24a or 24b either directly or through an enterprise network 112 that then transmits the assembled data 29b to a diagnostic processor 24ab. The diagnostic processor can be a computer with processor, display and memory area (data storage).

FIG. 1A shows two peripheral intellectual measurement equipment (PIM) 113a, 113b configured to collect sensor data, process the sensor data, form processed sensor data and transmit the processed sensor data and sensor data as assembled data 29abc.

In embodiments, (as shown in FIG. 1B) up to ten sensors can be connected in series to one peripheral intellectual measurement equipment 113a.

The sensor data can be received as voice data, text, email, telemetry, color, and/or digital images.

FIG. 1A also shows two diagnostic stations 120a, and 210b.

Each diagnostic station 120a and 120b communicates with an enterprise network 112 shown as dotted lines 28a, 28b.

Each diagnostic station has a diagnostic processor 24a, 24b in communication with a non-transitory computer readable medium also referred to herein as "a diagnostic data storage 26a, 26b.

The one or more diagnostic stations receive the assembled data, compare the assembled data to preset threshold values for diagnostic features installed in each diagnostic data storage and generate diagnostic information 28a, 28b.

Each diagnostic station has a diagnostic station identification, diagnostic station access rights, and a diagnostic database in the diagnostic data storage, all of which are shown in later figures.

Each diagnostic station has instructions in the diagnostic data storage to instruct the diagnostic processor to use a diagnostic passport 30 shown in detail in FIGS. 4A-4H and the assembled data which includes sensor data, and calculate diagnostic features and technical states for all or portions of equipment that generates vibration and static equipment while simultaneously using the threshold values for each diagnostic feature already stored in the diagnostic station data storage.

Each diagnostic data storage has instructions for the diagnostic processor to generate diagnostic prescriptions 35 (also shown in FIGS. 4A-4H) for each threshold value of each diagnostic feature. Additional types of diagnostic prescriptions can also be generated for prototypes and prototype parts.

The diagnostic information is presented simultaneously as multiple executive dashboards, namely, a Monitor Executive Dashboard, a Trend Executive Dashboard, an Analysis Executive Dashboard, a Report Executive Dashboard, a System Executive Dashboard, and an Oscilloscope Executive Dashboard, as shown in FIGS. 6A-6H.

FIG. 1A also shows an administrative processor 200 communicating with the enterprise network 112, and with a global communication network 115.

The global communication network can be a satellite network, a cellular network, a local area network, a wide area network, a global communication network, such as the internet, or combinations of these networks.

The enterprise network can be a local area network or a wide area network and may be a cellular network.

The administrative processor 200, which can be a computer, also communicates with an administrative data storage 202 and an administrative display 203.

The administrative processor is configured to collect the diagnostic information 28a, b from each diagnostic station, via the enterprise network or the global communication network 115 or both networks.

The administrative processor then follows instructions 47 in the administrative data storage (shown in FIG. 2A) to compile the collected diagnostic information into the aforementioned plurality of executive dashboards (Analysis Executive Dashboard 3004a through 3004d is shown) which can be transmitted simultaneously to client devices 102 shown in FIG. 1A as well as appear on the administrative display and the displays of the diagnostic stations which are shown as elements 122a and 122b

Client device 102 enables the system 1000 to have remote monitoring and control of the automatic real-time diagnostics.

Each client device 102 has a client device processor, a client device memory area (data storage) and client device display 103.

Each client device provides bidirectional communication with each diagnostic station and an administrative processor through the enterprise network.

Each client device is also configured to communicate through the global communication network, such as the Internet, a satellite network, a cellular network or combinations of the networks.

Each client device is configured present all the executive dashboards (the Analysis Executive Dashboard 3004a is shown) by toggling through the buttons referencing the dashboards, while the administrative processor presents the same Analysis Executive Dashboard 3004b on the display connected to the administrative processor.

The diagnostic stations can also present simultaneously, the same Analysis Executive Dashboard 3004c and 3004d simultaneously for a group of equipment that generates vibration and static equipment in a facility.

In embodiments, the client device can be a cell phone, a laptop, a desk top computer, or a tablet having bidirectional communication and processing.

Each client device can be in communication with both the enterprise network 112 and a global communication network 115 simultaneously in embodiments.

FIGS. 2A-2B show details of the administrative processor 200 in communication with an administrative display 203 and administrative data storage 202.

The administrative data storage has a diagnostic database 125 containing diagnostic information 28 and a list of configurations 4080 and a list of channels 4082.

An example of diagnostic information is vibration of a motor. An example of a list of configurations is a list of operational configurations for the motor.

The administrative data storage 202 is a computer readable media that is non-transitory, and contains computer instructions 47 for instructing the administrative processor to automatically collect and store the diagnostic information 28 from the diagnostic stations and automatically compile the diagnostic information 28 into the diagnostic database 125.

FIGS. 2A-2B show the administrative data storage 202 containing at least one client profile 52, at least one diagnostic station identification 4070, at least one enterprise identification 4072, diagnostic station access rights 4074 and a list of diagnostic stations in a facility 4076.

An example of a diagnostic station identification 4070 is Station 12 connected to 100-psi water pump.

An example of an enterprise identification 4072 is the hydroelectric plant in Idaho Falls, Id.

An example of diagnostic station access rights 4074 is a set of rights that enable an operator to view different levels of information on the machinery in the facility.

An exemplary list of diagnostic stations in a facility 4076 is a list of three stations such as D-1, D-2 and D-3 in a power plant.

FIG. 3 depicts a client device 102 according to one or more embodiments.

The client device 102 has a client device display 103 with a client device processor 104 in communication with a client device data storage 106. The client device can be a laptop, a cell phone such as an Apple Smart phone, a tablet computer or a wearable computer.

Each client device provides bidirectional communication with the plurality of diagnostic stations and the administrative processor, and configured to present the diagnostic information simultaneously by automatically populating each of the Monitor, Trend, Analysis, Report, System and Oscilloscope Executive Dashboards.

FIGS. 4A-4H depict the diagnostic data storage 26 in communication with a diagnostic processor 24 that also communicates with a diagnostic display 122 according to one or more embodiments.

In embodiments, the diagnostic data storage 26 can contain sensor data 25, threshold values for diagnostic features 27, diagnostic information 28, assembled data 29, diagnostic passport 30, updated sensor data 31, diagnostic features 32, and vibration information 33.

An example of threshold values for a diagnostic feature 27 is 11 square inches per second.

An example of a diagnostic feature 32 is vibrational acceleration.

An example of vibration 33 information is 33 inches per minute.

The diagnostic data storage 26 also contains technical states 34 for each diagnostic feature of all or portions of equipment that generates vibration and static equipment 108.

An example of a technical state for a pump is action required.

FIG. 4A depicts a diagnostic prescription 35 containing a check bearing 95, a check for imbalance 96, a check for misalignment 97, and check for lubrication 98 as the prewritten text of the diagnostic prescription for a specific piece of equipment that generates vibration. These diagnostic prescriptions can be automatically presented as prewritten text.

FIGS. 4A-H show trends 36 which are presented on the executive dashboards as a visual presentation.

Diagnostic rules and configurations 37 are shown stored in the diagnostic data storage.

An example of diagnostic rules and configurations includes "x=signal, y=integer of x and v=RMSy (Root mean square y is a measure of the magnitude of a y which is a varying quantity).

One or more reports 38a are stored in the diagnostic data storage, each report using the diagnostic information 28 and wherein the reports are automatically generated using computer instructions in the administrative data storage and using preset user requests from a stored client profile or according to a preset schedule for maintenance of equipment that produces vibration and static equipment as indicated in the client profile. The reports can be "new reports" or "created preset reports."

An example of a created preset report is a standard report that such as a pump repair report having dates and times with serial numbers of pumps to be repaired or inspected, and may include all pump conditions at a facility or within a specific unit.

The visual interface 39 of the System Executive Dashboard is stored in the diagnostic data storage which is automatically generated when information is generated by the diagnostic station, enabling monitoring, configuration and control of the plurality of peripheral intelligent measurement equipment, the plurality of diagnostic stations and the plurality of sensors. Later figures present a graphic image of the visual interface.

FIG. 4A-H depict computer instructions 50 to instruct the diagnostic processor to generate and simultaneously present a Monitor Executive Dashboard 3000, a Trend Executive Dashboard 3002, an Analysis Executive Dashboard 3004, a Report Executive Dashboard 3020, a System Executive Dashboard 3030, and an Oscilloscope Executive Dashboard 3040 on at least one client device display.

The diagnostic data storage 26 can include computer instructions 51 to instruct the diagnostic processor 24 to form and store a client profile 52.

The client profile 52 can include equipment that generates vibration and static equipment identifiers 54 such as names and models.

The client profile 52 can include a serial number for each piece of equipment that generates vibration and static equipment at a facility, with a name of a facility.

The client profile 52 can include a client identifier 56 such as a company name, like Fortuna electric plant.

The client profile 52 can include quantities of equipment that generates vibration and static equipment 57, such as 10 pumps, and optionally include an image 21, such as a digital photograph that uniquely depict one or more pieces of equipment that generates vibration and static equipment such as a photograph of a 10 hp Positive pressure water pump.

FIGS. 4A-4H depict a Library of Specifications 59 that is stored in the diagnostic data storage.

The Library of Specifications 59 includes equipment physical parameters by type of equipment that generates vibration and static equipment 67.

An example of an equipment physical parameter is diameter of axial gap.

The Library of Specifications 59 includes volume of fluid being moved by the equipment that generates vibration and static equipment 68, such as 2 meters$^3$, internal schematic diagram of the equipment that generates vibration and static equipment 69, quantity and type of shafts for the equipment that generates vibration 71, such as 2 vertical shafts, quantity and type of seals for the equipment that generates vibration and static equipment 75, such as 3 thermoplastic seals, and quantity and types of rod for the equipment that generates vibration and static equipment 81 such as a vessel.

The Library of Specifications 59 includes quantity and type of bearings for the equipment that generates vibration and static equipment 82, such as 2 bearings in a motor, quantity and types of gears for the equipment that generates vibration and static equipment 83, such as 3 gears on an auger, quantity and types of cylinders for the equipment that generates vibration and static equipment 84, such as 2 hydraulic cylinders, and quantity and types of valves for the equipment that generates vibration and static equipment 85, such as 2 check valves and 2 butterfly valves.

The Library of Specifications 59 includes foundation for the equipment that generates vibration and static equipment 86, such as a plate or type of construction, and a technology scheme for the equipment that generates vibration and static equipment 87, pipeline connections for the equipment that generates vibration and static equipment 88, and quantity and type of impellers for the equipment that generates vibration and static equipment 89, such as 2 impellers made from plastic or aluminum.

The diagnostic data storage has instructions 4050 in the diagnostic data storage 26 for instructing the diagnostic processor to automatically generate a pointer 73 enabling a user to move around a macro view of an executive dashboard 4052 and a micro view of a portion of a macro view of the same executive dashboard 4054 simultaneously or move to another executive dashboards while additionally enabling a user to click between sections of each executive dashboard.

The macro view 4052 of an executive dashboard is stored in the diagnostic data storage.

The micro view 4054 of the same executive dashboard is stored in the diagnostic data storage.

The diagnostic data storage has computer instructions 4060 in the diagnostic data storage for instructing the diagnostic processor to automatically generate a pointer enabling a user to move between objects on any executive dashboard while additionally enabling a user to click between sections of an executive dashboard.

The pointer 73 enables a user to move between selected machines or units of technology to obtain automatically generated real-time diagnostics for the selected item. The pointer is stored in the diagnostic data storage.

Like the administrative data storage, the diagnostic data storage also contains a diagnostic station identification 4070, such as west wind station 2; an enterprise identification 4072, such as Trump identification 3, diagnostic station access rights 4074, such as code 2334 for accessing all levels of the diagnostic station, and a list of diagnostic stations in a facility 4076, which would list 4 to 10 diagnostic stations, and reports 38 such as historical reports that indicate failure dates for specific pieces of equipment.

The diagnostic data storage contains a diagnostic database 125 which can be interactive, such as a Sequel™ or Java™ interactive database, that further includes a list of configurations 4080 which can each have a different number for a certain geographic area in a facility and a list of channels 4082 which can be sequential numbers, such as channel 1, channel 2, channel 3, channel 4, channel 5.

For each configuration in the list of configurations 4080 is a configuration identification 5002, such as any word, such as "delayed coking unit"; parent configuration identification 5004, such as a plant name, "Lyondell Refinery", a configuration channel identification 5006, such as 8 vibro, meaning 8 sensors for vibration, a configuration type 5008, such as "measurement equipment measuring vibration acceleration", "equipment which generates vibration", such as a pump or compressor which equipment is also referred to as field technology equipment"; a list of configuration parameters 5010, such as quantity of equipment, a diagnostic passport 30, a list of sections 5012, such as quantity of pump houses at a facility, a list of objects 5014, such as a list of individual pumps in each pump house, and diagnostic information 28.

In the diagnostic data storage, the list of configuration parameters 5010 has a plurality of parameters 5011, with each parameter having a parameter identification 5013, such as a letter and a type of physical characteristic namely "A-acceleration" or a "V-velocity" or "S-displacement", a parameter type 5015, such as a number or a letter "A" or a floor or level in the facility, a geographic location in the facility, and a parameter value 5017, such as 9.75 square inches per second.

In the diagnostic data storage 26, the diagnostic passport 30 contains a plurality of object prototypes 5020, such as, a centrifugal compressor, a screw compressor, and a centrifugal pump.

Each object prototype 5020 has an object prototype identification 5022, such as a piston compressor, a schematic diagram with graphic images 5024, a list of object prototype parameters 5026, such as a quantity of impellers, an object handler 5028, which can be a link that engages one or more processors that contain instructions for operating the object; a list of object part prototypes 5030, such as a list of names of particular pieces of equipment in the object prototypes such as bearings, and a list of measurement point prototypes 5032, such as a list of axial vibration measurement points on front motor bearings.

The list of measurement point prototypes 5032 contains a plurality of measurement point prototypes 620, such as 9 different types of measured parameters like temperature, acceleration, and acoustic levels, and wherein each measurement point prototype has a measurement point prototype identification 622, such as the word "radial vibration", a measurement point prototype type 624 such as temperature, axial vibration, and radial vibration, and a signal processing list 626, such as references to diagnostic features of the object prototype which are calculated when the signal received for the measuring point.

The list of object part prototypes 5030 has an object part prototype identification 5033, such as a part or piece of equipment, such as a front bearing of a 200 gallons per minute pump, an object part prototype type 5035, such as a particular type of executing mechanism, like an air cooler, a list of object part prototype parameters 5037, which is a quantity of blades or for different types of ventilators or balls in a type of bearings, and a list of diagnostic feature prototypes 5039, includes many different types of acceleration of vibration, velocity of vibration, or displacement of vibration, temperature, or pressure.

The list of diagnostic feature prototypes 5039 includes many diagnostic feature prototype identifications 5062, such as a name of a feature such as "A-acceleration", a diagnostic feature prototype type 5064, such as the type "absolute vibration", "temperature", a diagnostic feature prototype measurement unit 5066, such as inches per minute, a prototype default value 5068, such as 1 square inch per second, a prototype minimum value 5070, such as 0.1 milliamps, a prototype maximum value 5072, such as 10,000 volts, an prototype indicator position 5074, such as sequenced number indicating a scaled position, prototype signal processing rules 5076, such as reference to the instructions for the processor for that piece of equipment to calculate the diagnostic feature for a particular signal generating device, prototype thresholds 5078, such as an unacceptable upper threshold of 100 volts, or an unacceptable lower threshold of 3 volts, and prototype diagnostic prescriptions 5080, such as "check bearing" or "check for lubrication" or "check for misalignment".

FIGS. 4A-4H show the diagnostic data storage with the list of diagnostic feature prototypes 5039, such as an acceleration of vibration, pressure, current, and temperature.

Each diagnostic feature prototype having a prototype threshold 5078 with an unacceptable upper threshold 600, such as 1000 kilowatts, an action required upper threshold 601, such as 800 kilowatts, an acceptable upper threshold 602, such as 600 kilowatts, an unacceptable lower threshold 603, such as 0 kilowatts, an action required lower threshold 604, such as 100 kilowatts, and an acceptable lower threshold 605, such as 200 kilowatts.

The prototype diagnostic prescriptions 5080 have an unacceptable upper prescription 610, such as check bearing in red color, an action required upper prescription 611, such as check bearing in yellow color, an acceptable upper prescription 612, such as check bearing in green color, an unacceptable lower prescription 613, such as check bearing in the red color, an action required lower prescription 614, such as check bearing in another yellow color, and an acceptable lower prescription 615, such as check bearing in green color.

FIGS. 4A-4H show the diagnostic database 125 with a list of sections 5012 in the diagnostic database 125 wherein each section 640 has a section identification 642, such as "compressor house 1", vector graphics 644 such as set of geometrical figures which describe particular images of equipment or sections of a facility with indicated direction for action, and object images 646.

FIGS. 4A-4H depict the diagnostic database 125 having the list of objects 5014 such as generators, turbines, wherein each of the objects has an object identification 250, such as Gen-1 or a serial number, an object prototype identification 251, such as Gen-1 with fuel house, an object section 252, such as Generator house which may include several generators, a screen position for an object 253, such as top left corner generator, a child configuration identification 254, such as Delayed coking unit 10, an original diagnostic station identification 255, a list of object parameters 256, such as a list of vibrations for all objects, a list of object parts 257, such as size of bearings for and quantity and type of bearings for a pump, and a list of measurement points 258 such as rear axial vibration of motor.

The list of object parts 257 contains object part prototype identification 270, such as hose clamp model number and diameter, a list of object part parameters 271, such as vibration and acceleration, and a list of diagnostic features 272, such as a list of vibration acceleration and a list of temperatures and pressure for the object part.

It should be noted that the list of measurement points 258 has for each measurement point: a measurement point prototype identification 310, such as temperature, a measurement point channel identification 311, such as front temperature, and a validators list 312, such as "front motor temperature".

The validators list 312 contains references to diagnostic features which indicate an equipment state as nonfaulty or faulty.

FIGS. 4A-4H show the diagnostic database 125 containing the list of diagnostic features 272 with each diagnostic feature having a diagnostic feature prototype identification 290, which can be serial numbers, diagnostic feature thresholds 291, such as 100 volts each 1 minute, and a validation list 292, such as a list of references to diagnostic features which describe particular state of measurement point.

FIGS. 4A-H show that the diagnostic database having for each channel in the list of channels 4082, a channel identification 390, such as "A-Acceleration", a channel signal cache 391, such as "copy of signal of acceleration", a channel signal correction settings 392, such as "a set of coefficients for correction measurements usable with amplitude or frequency response characteristics of signals", channel signal processing list 393, such as a set of references to measurement points, and a channel handler 394, which can be a link that engages one or more processors that contain instructions for operating the channel.

The FIGS. 4A-4H depict the diagnostic information 28 with an initial time 320, such as 2 pm GMT on Wednesday Aug. 2, 2017, an update time 321, such as 4 pm GMT on Wednesday Aug. 2, 2017, a state 322, such as "acceptable", a summary state 323, such as "acceptable, unacceptable, action required", a mode 324, such as "in operation", a summary mode 325, such as "in operation, out of operation", a most hazardous object part of the configuration 326, such as gas vent 33, a section state 330, such as "acceptable", a section summary state 331, such as "acceptable, unacceptable, action required", a section mode 332, such as "in operation", a section summary mode 333, such as "the total set of modes of the equipment in the section, such as 4 are operation and 2 are out of operation," a most hazardous object part of each section 334, such as the front bearing of pump P-99 which is contained in the section 22, an object state 340, such as unacceptable, an object summary state 341, such as a set of all unacceptable, acceptable, and action required states, an object summary mode 343, such as two pumps are in operation and three pumps are out of operation, an object part state 350, such as bearing of a motor is in an unacceptable state, an object part summary state 351, such as bearing of a motor is acceptable, bearing of a compressor is unacceptable, bearing of a centrifugal pump is in action required condition, an object part repairs 352, such as misalignment elimination of shaft in a pump, balancing of pump, object part changes 353, such as a name of a task that is completed that changed an object part, object part works 354, such as a name of an operation or action indicating a new manner in which task was performed by the object, a hazard level of each object part 355, such as 20% of hazard rate, a measurement point state 360, such as operational, a summary state 323, such as all temperature sensors are operation on the pump, an update time 321, such as 2 pm GMT Aug. 3, 2017, a diagnostic value 371, such as 100 degrees Fahrenheit, a diagnostic minimum 372, such as 10 degrees Fahrenheit, a diagnostic maximum 373, such as 120 degrees Fahrenheit, a diagnostic state 374, such as acceptable, a diagnostic summary state 375, such as a set of acceptables for several temperature sensors, updates 376 of each diagnostic feature such as the pump is now working 2 hp faster than at 2 pm, and a diagnostic data history 119, such as trend of parameters.

Figure 5A:
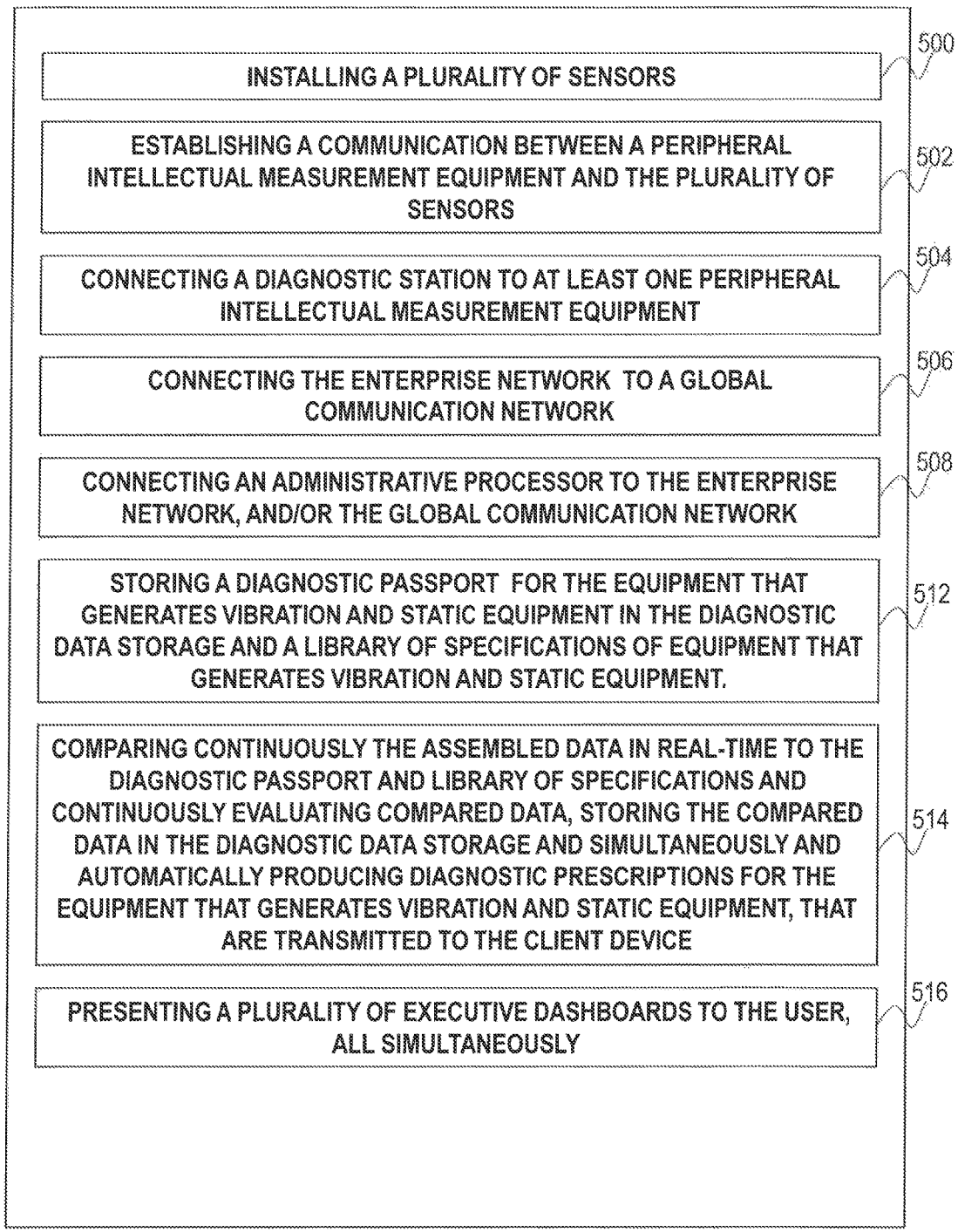

FIG. 5 depicts an exemplary method according to one or more embodiments.

The method for generating automatic real-time diagnostics for equipment that generates vibration and static equipment can include, but is not limited to the steps described below. The method can be utilized by a person of ordinary skill in the industry, and is not limited to a particular order or sequence.

The method enable real-time diagnostics to be presented a composite visualization of the equipment that generates vibration and static equipment on a client device while simultaneously depicting the operating mode, maintenance mode, and post maintenance mode for all or portions of each piece of equipment that generates vibration and static equipment, for groups of equipment that generate vibration and static equipment, and for all equipment in a facility that generates vibration and static equipment, and further providing a graph showing diagnostic features as trend lines and thresholds usable to predict maintenance events associated with the virtual image with tag of the equipment that generates vibration and static equipment, thereby enabling simultaneously and automatic real-time diagnostic analysis, real-time trend updating and real-time viewing of maintenance activities on the equipment that generates vibration and static equipment.

Step 500 of the method involves installing a plurality of sensors on or proximate to at least one piece of equipment that generates vibration and static equipment, the plurality of sensors configured to transmit sensor data.

Step 502 of the method involves establishing a communication between a peripheral intellectual measurement equipment (PIM) and the plurality of sensors with the peripheral intellectual measurement equipment collecting the sensor data, processing the sensor data and transmitting processed sensor data as assembled data.

Step 504 of the method involves connecting a diagnostic station to at least one peripheral intellectual measurement equipment directly or through an enterprise network, each diagnostic station configured to receive the assembled data and generate diagnostic information, each diagnostic station comprising a diagnostic data storage in communication with a diagnostic processor.

Step 506 of the method involves connecting the enterprise network to a global communication network.

Step 508 of the method involves connecting an administrative processor to the enterprise network, and/or the global communication network and using an administrative data storage and an administrative display, with the administrative processor configured to collect diagnostic information directly from each diagnostic station and to transmit diagnostic information to at least one portable client device in communication with both the enterprise network and the global communication network.

Step 512 of the method involves storing a diagnostic passport for the equipment that generates vibration and static equipment in the diagnostic data storage and a Library of Specifications of equipment that generates vibration and static equipment.

Step 514 of the method involves comparing continuously the assembled data in real-time to the diagnostic passport and Library of Specifications and continuously evaluating compared data, storing the compared data in the diagnostic data storage and simultaneously and automatically producing diagnostic prescriptions for the equipment that generates vibration and static equipment, that are transmitted to the client device.

Step 516 of the method involves presenting a plurality of executive dashboards to the user, all simultaneously, including a Monitor executive dashboard, a Trend executive dashboard, an Analysis executive dashboard, a Report executive dashboard, a System executive dashboard, and an Oscilloscope executive dashboard.

Step 518 of the method involves presenting simultaneously first and second horizontal thresholds and a movable pointer in the automatic real-time diagnostics to depict a plurality of changing diagnostic features in time relative to threshold levels, providing indications of safe operation and depicting maintenance needed for the equipment that generates vibration.

Figure 6A:
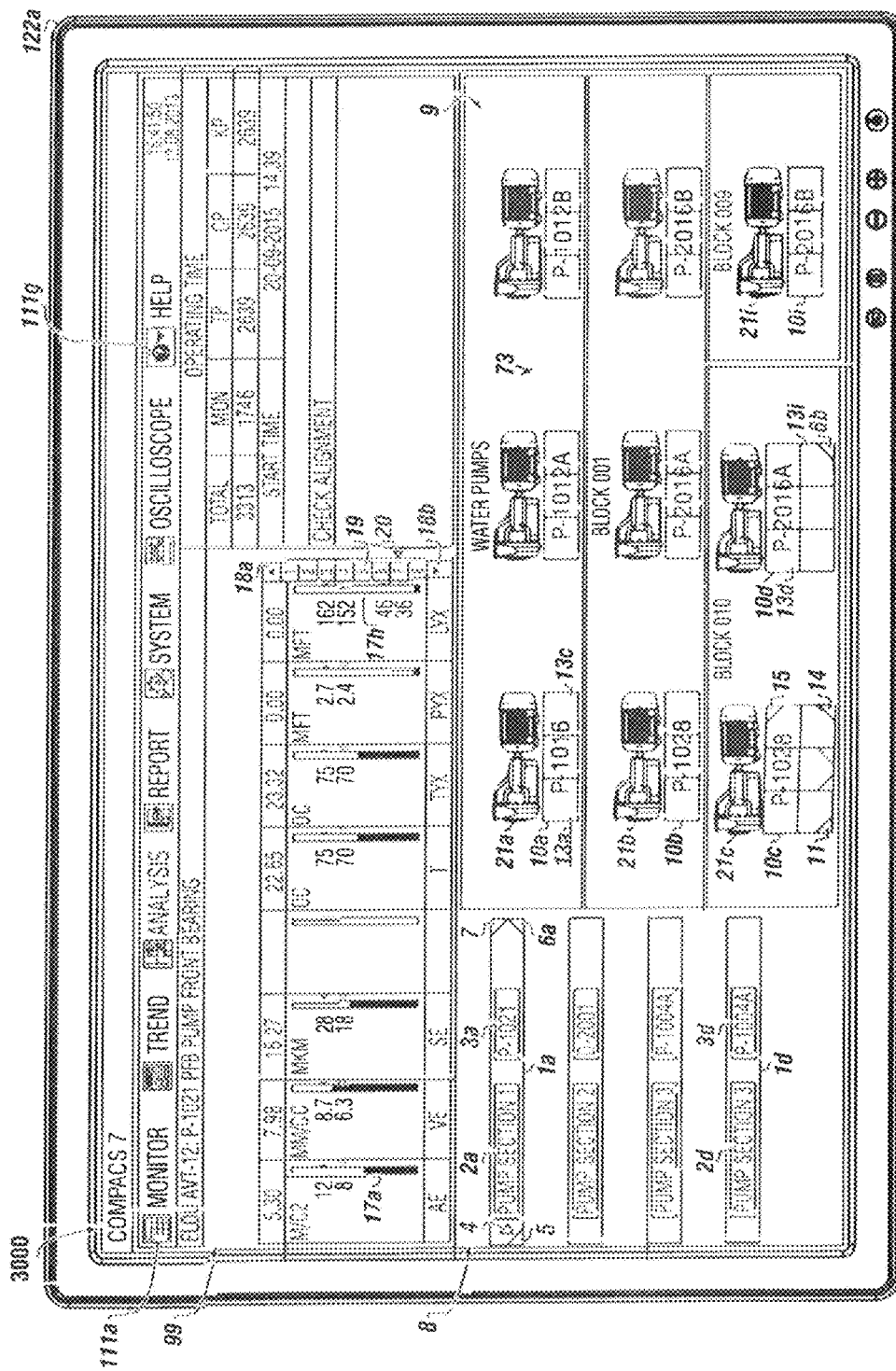

Step 520 of the method involves presenting a plurality of virtual images of the equipment that generates vibration and static equipment, each virtual image with a virtual tag with components, each component connected to a section of the equipment, each component colorizable to indicate condition of operation, each virtual tag additionally presenting at least one colorized condition triangle within the virtual tag, the color triangle corresponding to a worst machine condition of a group of machines before stoppage FIG. 6A depicts the Monitor Executive Dashboard 3000 according to one or more embodiments.

At the right of the screen, the diagnostics executive display shows the field 9 of equipment that generates vibration and static equipment with graphical symbols 21a-21i for each piece of the equipment that generates vibration and static equipment of the selected field.

To display the selected field, the method uses triangle graphic symbols 6, 11, 14, 15 positioned in boxes 10a, 10b, to 10i and boxes 13a-13i beneath each piece of equipment generating vibration. Each triangle has a different meaning on status of the equipment.

A pointer 73 indicates which section the user is viewing.

On the left side the executive dashboard is presented a name of the section 2a-2d being graphically presented.

At the right side of that same area being presented, the method displays the name of the worst piece of equipment that generates vibration and static equipment (noted as elements 3a-3b).

The color of the rectangle graphic symbol 1a-1d corresponds to a color for the worst section equipment that generates vibration and static equipment. For example, the equipment that generates vibration and static equipments of the "Pumping Section 1" can show the section graphic symbol's color as yellow, which corresponds to the "ACTIONS REQUIRED" state of the worst piece of equipment that generates vibration and static equipment in this section 10b.

The worst piece of equipment that generates vibration and static equipment's name "P-2016A" displays at the right of the section graphic symbol 3a. A triangular cursor 6a points to the worst piece of equipment that generates vibration and static equipment.

When the values of a large group of diagnostic features are being displayed in the executive dashboard to the right of the bar graphs of a digital graphic indicator 17a-17h. This dashboard outputs eight graphic symbols of page numbers 19.

The executive dashboard displays the page number 19 for each page graphic symbol. To display the selected page the method uses the triangle graphic symbol 20 at the right of the page graphic symbol.

The Monitor Executive Dashboard 3000 can present a plurality of icons (also known as tabs) 111a-111f to indicate which display is being viewed, 111a identifies the monitor executive dashboard other icons highlight when the trend, analysis, report, system, oscilloscope, dashboards or permit navigation to those simultaneously generated dashboards. Each tab can open another page of real-time data. Button 111g is a help button.

In embodiments, the Monitor Executive Dashboard can display a date and a time.

The Monitor Executive Dashboard 3000 automatically uses the assembled data to generate diagnostic information graphically and visually simultaneously for: (i) portions of equipment in a facility, (ii) individual equipment in a facility, (iii) groups of equipment in a facility, and (iv) all equipment in a facility as a visual presentation: for monitoring by worst operating condition at least one of: the portions of equipment in the facility, the individual equipment in the facility; the groups of equipment in the facility, and all equipment in the facility.

The color of the page graphic symbol matches the color of the worst diagnostic feature in the page. To switch to the pages with the number more than eight, the graphic command characters 18a-18b are used. When the command character 18a is affected, the method displays the previous eight pages, when the command character 18b is affected; the method displays the following eight pages.

The method displays the equipment that generates vibration and static equipment's functional image as a graphical image next to the graphic symbol of the equipment that generates vibration and static equipment. The given screen example shows a functional equipment that generates vibration and static equipment image. In this case, centrifugal pump 21a-21i is located over virtual tags 10a-10i.

To display the equipment that generates vibration and the static equipment's condition before stoppage, the executive display shows a red triangle tag 11, which color corresponds to the equipment that generates vibration and static equipment's condition before stoppage. For example, the triangle tag can be red, which means the "UNACCEPTABLE" state of the piece of equipment that generates vibration and static equipment before stoppage.

To display the piece of equipment that generates vibration and static equipment start with no repair causes and/or the list of repairs specified by the personnel, the method can display a brown triangle tag 15 at the upper right of the equipment that generates vibration and static equipment graphic symbol.

To display the availability of faulty channels connected to the piece of equipment that generates vibration and static equipment, the method displays a blue triangle tag 14 at the bottom right of the equipment that generates vibration and static equipment graphic symbol.

To display the state of the piece of equipment that generates vibration and static equipment of the section before stoppage, the executive display shows a triangle tag 5, the color of which corresponds to the worst condition of the section of equipment that generates vibration and static equipment before stoppage.

In this example, the triangle tag can be red, which is the worst condition of the section of equipment that generates vibration and static equipment before stoppage is "UNACCEPTABLE" and is determined by the piece of equipment that generates vibration and static equipment "P-1028" 10a.

To display the start of the section equipment that generates vibration and static equipment with no repair causes and/or the list of repairs specified by the personnel at the upper right of the section graphical symbol, the method can display a brown triangle tag 7.

The Monitor Executive Dashboard can include a plurality of diagnostic features for each vibration sensor can measure: vibration acceleration such as in gravity, vibration velocity such as in inches per minute, vibration displacement such as in mils, speed of changes of vibration acceleration such as gravity per sec, rate of change of vibration velocity such as inch per minute per second, and rate of change of velocity displacement such as mils per second.

Figure 6B:
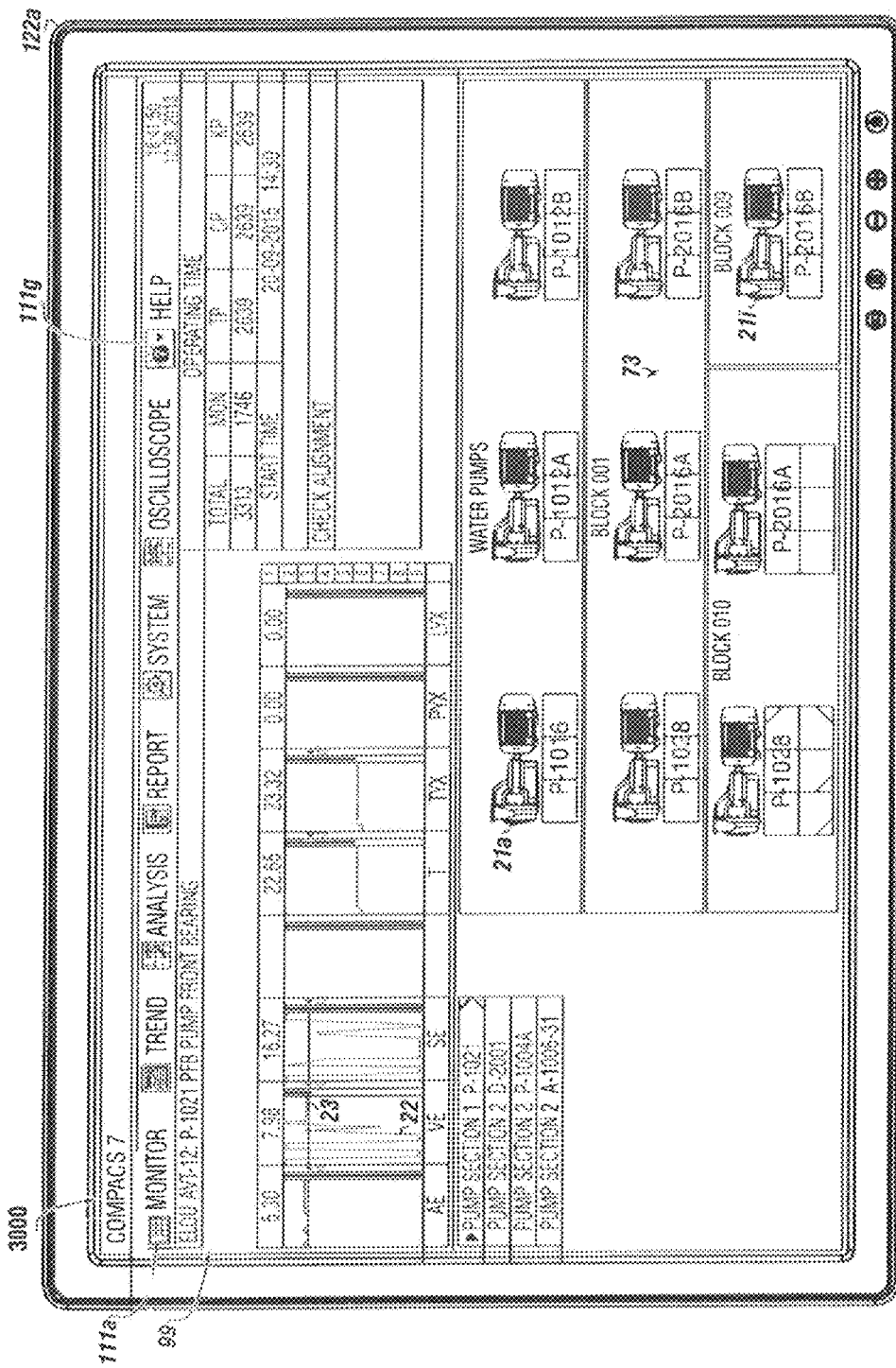

FIG. 6B is another embodiment of the Monitor Executive Dashboard 3000.

The latest measured areas of diagnostic features trends can be displayed in the Monitor executive dashboard display on command from the keyboard. The executive dashboard display can show at the bar graphs the latest measured values of diagnostic features as a trend line 22. The diagnostic features can be shown as horizontal lines 23. The horizontal lines can be red for the "UNACCEPTABLE" state and yellow for the "ACTIONS REQUIRED" state.

The background color of messages can correspond to the worst technical condition of the piece of equipment that generates vibration and static equipment for the given time interval. In this example, there are faulty channel messages, "UNACCEPTABLE" state messages, "ACTIONS REQUIRED" state messages and "ACCEPTABLE" state massages.

Diagnostic prescriptions include check bearing 95, check for imbalance 86, check for misalignment 97 and check for lubrication 98. Check alignment is provided as a diagnostic prescription 35.

Figure 6C:
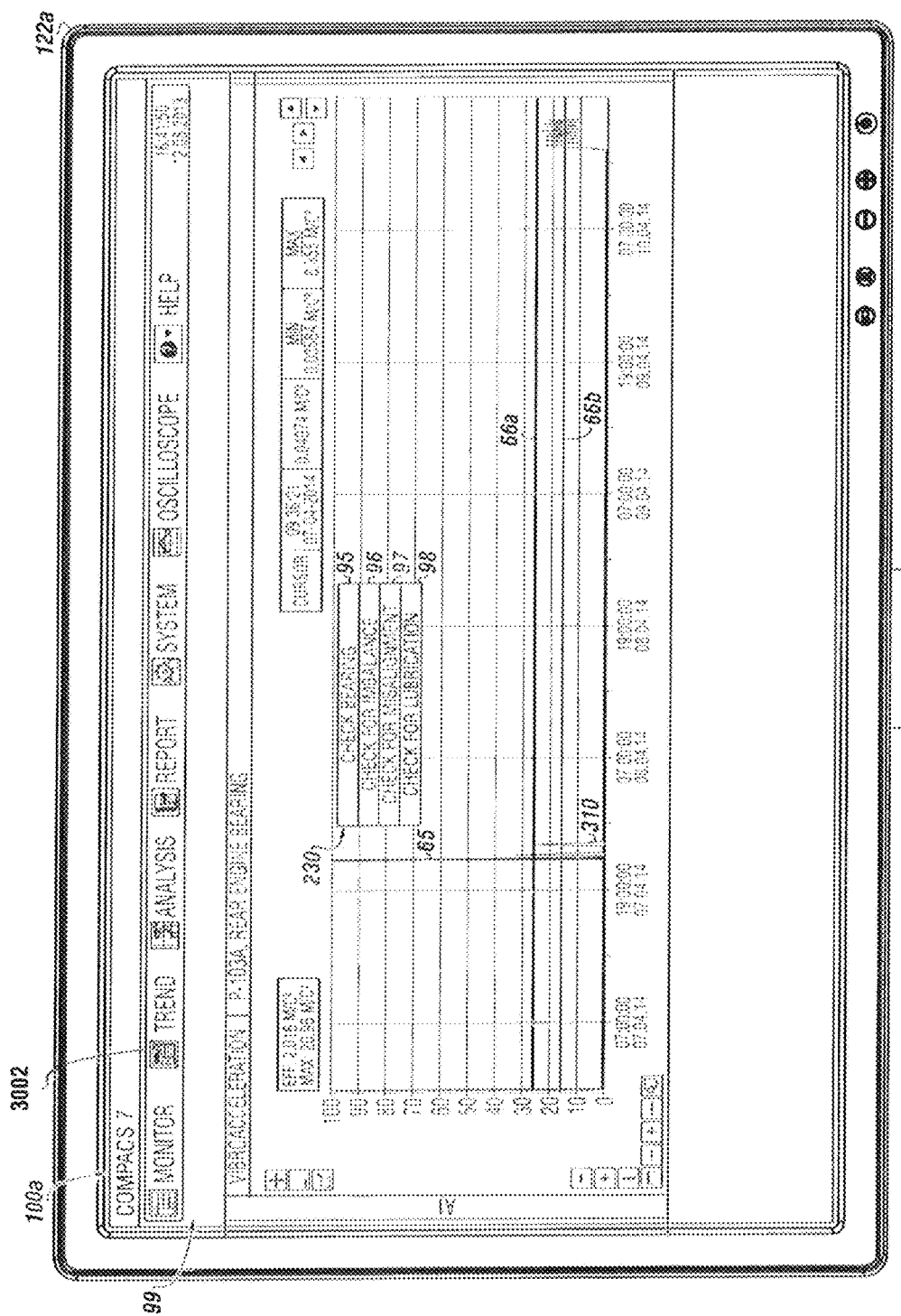

FIG. 6C depicts an embodiment of a Trend Executive Dashboard 3002 that uses automatically compares diagnostic information to threshold values for diagnostic features and generates trends 2002 as a visual presentation 3003 allowing macroviews and microviews of the same trends.

The Trend Executive Dashboard 3002 automatically compares diagnostic information to first and second horizontal threshold levels 66a and 66b while simultaneously displaying a moveable pointer within the real-time diagnostics usable to depict threshold values indicating safe operation or depict required maintenance needed for the equipment that generates vibration and static equipment.

The diagnostic prescription 35 includes a check bearing 95, check for imbalance 96, a check for misalignment 97, and check for lubrication 98.

FIG. 6D shows an embodiment of an Analysis Executive Dashboard 3004 that automatically presents assembled data as a visual presentation of signals 3006, a visual presentation of a data forms used by diagnostic rules comprising: spectra, cepstrums, and wavelets; and simultaneously (a) calculating each diagnostic feature and (b) creating and editing diagnostic rules and configurations stored in the diagnostic data storage.

The Analysis Executive Dashboard shows the name 1001 of the part being analyzed, here "bearing of motor" and physical properties 1007a-1007f. The name of related parts, in this diagram "stator" 1004 is also shown. An indication of a suggested repair 1006 is given the trend is also provided in this Analysis executive dashboard.

The analysis mode allows spectrum characteristics of signals to be compared to a spectrum of signals, here, voltage, and vibration acceleration are depicted.

FIG. 6E depicts an embodiment of the Report Executive Dashboard 3020 as indicated by its button 111d.

The Report executive dashboard automatically generates multiple reports 38a,b,c,d,e,f and 38g using the diagnostic information based on preset user requests or according to a preset schedule for maintenance of equipment that produces vibration and static equipment and provides the "next event" 38a for user review based on the reports. The reports can be "new reports" 1223 or "created preset reports" 1224.

Figure 6F:
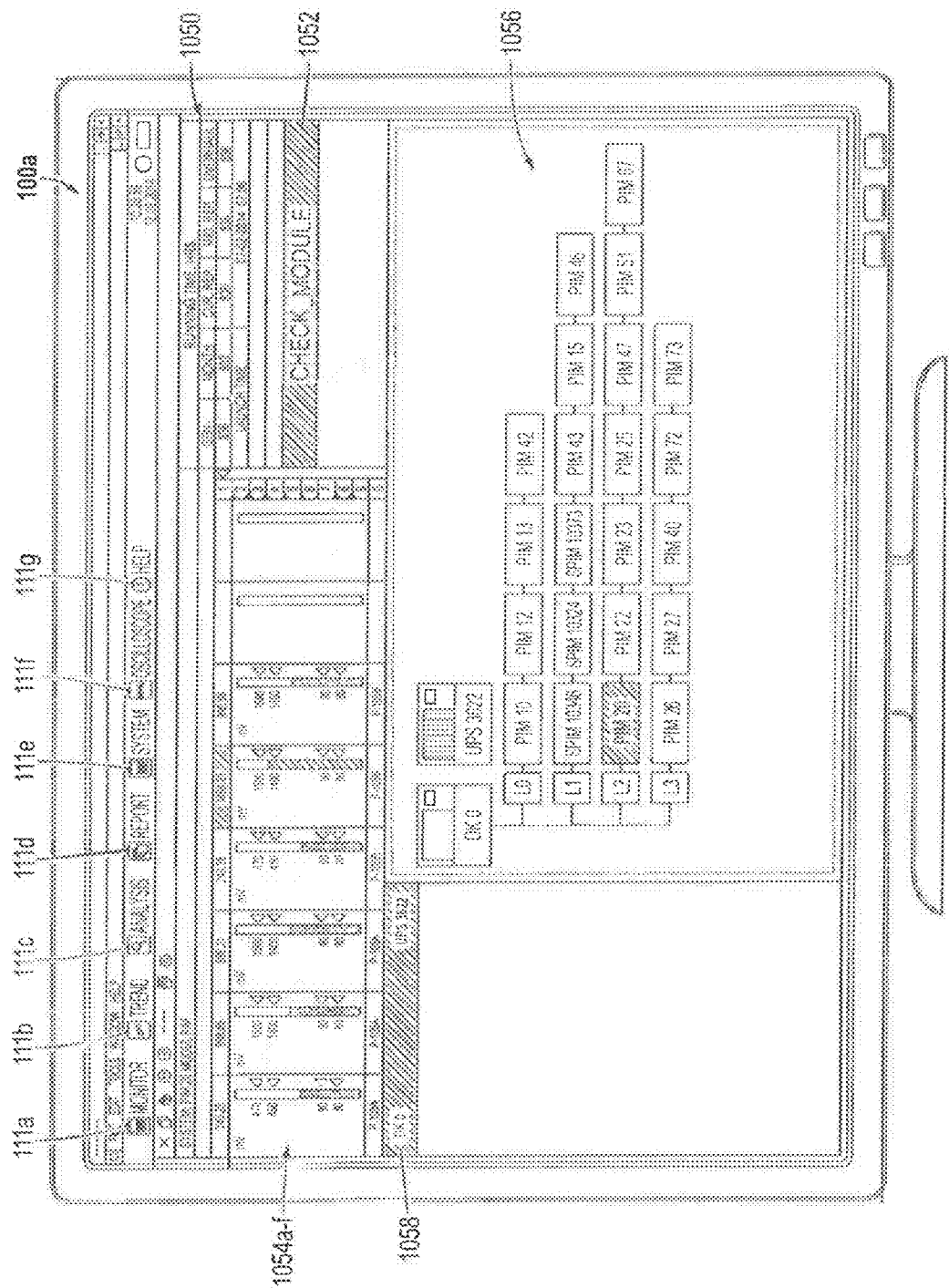

FIG. 6F depicts an embodiment of a System Executive Dashboard 3030 with the system indicator button 111e.

The System Executive Dashboard 3030 automatically generates a visual interface 3032 enabling monitoring, configuration and control of a plurality of AE sensors, from a plurality a AE sources and the plurality of peripheral intelligent measurement equipment, and the plurality of diagnostic stations all simultaneously and present the visual interface with operating times 9008, alarms 9007, and diagnostic operating levels 9010.

In particular, this System Executive Dashboard generates a 3D model of a liquefied natural gas (LNG) vessel and provides a prescription 9007 of the automatic expert system with messages issued by the automatic expert system in the form of diagnostic prescription for the personnel to take immediate action.

FIG. 6G shows a second version of a System Executive Dashboard, 3030 showing a plurality of voltages 1054a-f, details on a specific sensor 1058, a virtual location of the specific sensor in the facility 1056, a prescriptions 1052 to "Check PIM module 10".

FIG. 6H depicts the Oscilloscope Executive Dashboard 3040 as indicated by the indicator button 111f.

The Oscilloscope executive dashboard automatically generates a visual interface with a visual signal diagram 3042 of sensor data, signal parameters 3043, operation parameters for channels 3044, buttons for switching between different operation modes of oscilloscope 3045, operational parameters for peripheral intellectual measurement equipment 3047, with synchronization in real time, when sensor data changes.

FIG. 7 depicts an embodiment of an exemplary peripheral intellectual measurement equipment 113.

In embodiments, peripheral intellectual measurement equipment includes a plurality of peripheral intellectual modules 1110a-d.

Each peripheral intellectual module is configured for receiving sensor data 25a-d from separate sensors respectively.

Each peripheral intellectual module transfers sensor data as shown.

Each peripheral intellectual module connects to a fieldbus 1112a-d.

Each fieldbus 1112a-d is in communication with a controller 1115 that receives sensor data from each peripheral intellectual module, and processes the sensor data forming assembled data 29a and 29b. The controller 1115 then transfers assembled data 29a, and 29b to one or more diagnostic processors 24a and 24b either directly or through the enterprise network 112.

In embodiments, the peripheral intellectual measurement equipment (PIM) can be a portable vibrometer with a signal storage connected to at least one vibration sensor and sensors selected from the group consisting of: temperature sensors, and rotation frequency sensors, wherein each sensor and the portable vibrometer is configured for transmitting signals as assembled data to the diagnostic station directly or through the enterprise network.

In embodiments, each client device is selected from the group consisting of: a cellular phone, a laptop, a desk top computer, or a tablet computer.

In embodiments, the administrative processor and data storage are a cloud computing system.

In embodiments, each executive dashboard can have a plurality of physical parameters, the physical parameters comprising: vibration acceleration, vibration velocity, vibration displacement, and speed of changes of vibration acceleration, In embodiments, the equipment that generates vibration and static equipment is located at a plurality of locations and the locations are presented on the Monitor executive dashboard.

In embodiments, the diagnostic object that generates vibration is located at a plurality of locations at a facility and the plurality of locations is presented on the Monitor Executive Dashboard.

In embodiments, the equipment that generates vibration and static equipment comprises a motor, a rotary equipment, a centrifugal pump, a screw pump, a piston pump, a centrifugal compressor, a screw compressor, a piston compressor, gears, air coolers, fans, and blowers.

The method automatically generates real time diagnostic information from assembled data as a composite visualization of equipment in a facility by (i) portions of equipment in a facility, (ii) individual equipment in a facility, (iii) groups of equipment in a facility, and (iv) all equipment in a facility with the Monitor, Trend, Analysis, Report, System and Oscilloscope executive dashboards enabling a visualization of user selected diagnostic features, user selected trends, identification of equipment that generates vibration and static equipment, operational parameters enabling prediction of maintenance events associated with equipment that generates vibration and static equipment, while presenting the equipment that generates vibration as virtual images with each virtual image having at least one virtual tag representing diagnostic information providing simultaneous and automatic real time diagnostic analysis, real time equipment trend updating, proposed maintenance schedules, and real time viewing of maintenance activities on at least one portion of equipment that generates vibration and static equipment.

In embodiments, the method uses a diagnostic passport for each technology unit.

In embodiments, the method generates a pointer enabling a user to move around in the automatic real-time diagnostics and click between sections to bring up additional information.

Figure 8B:
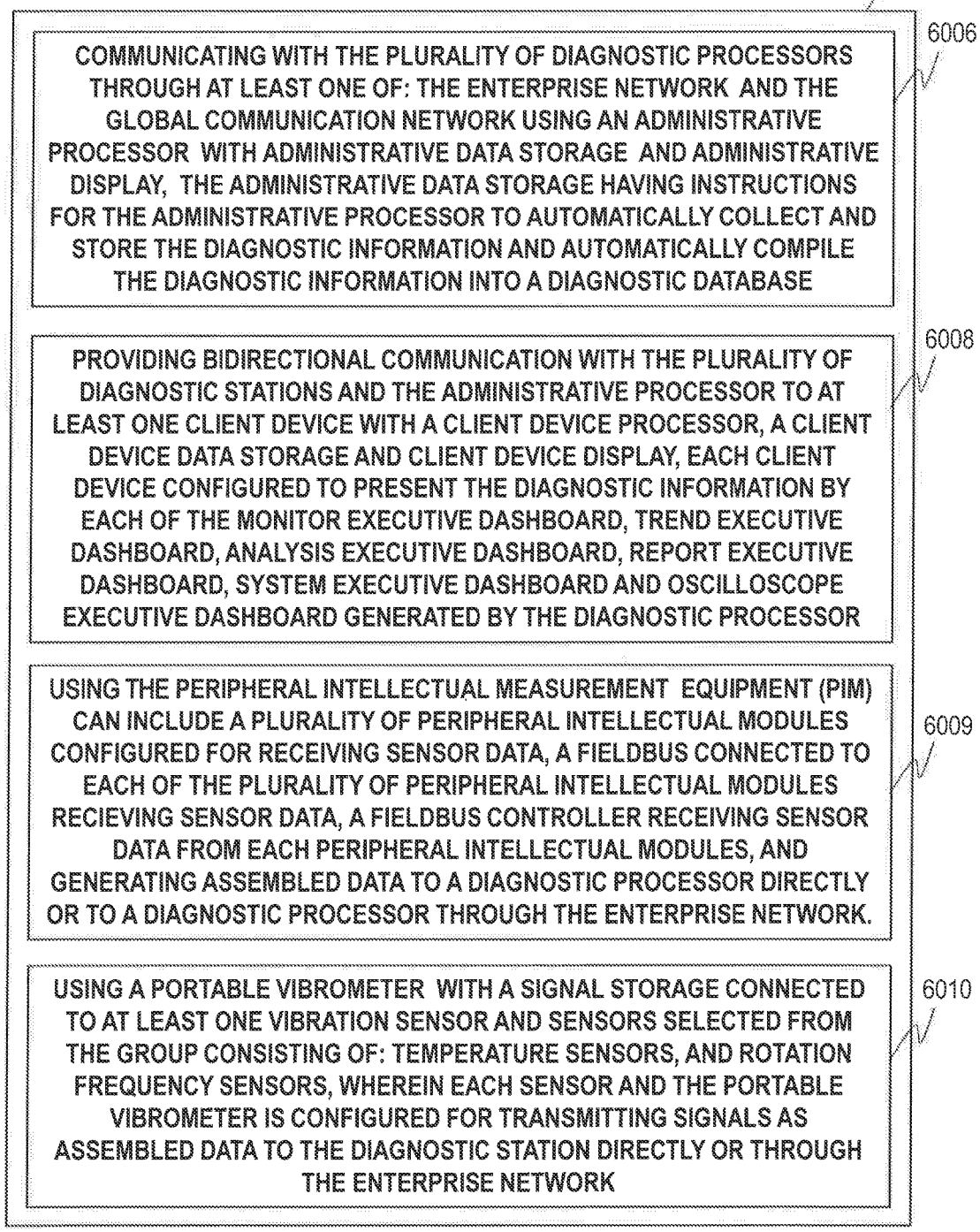
Figure 8C:
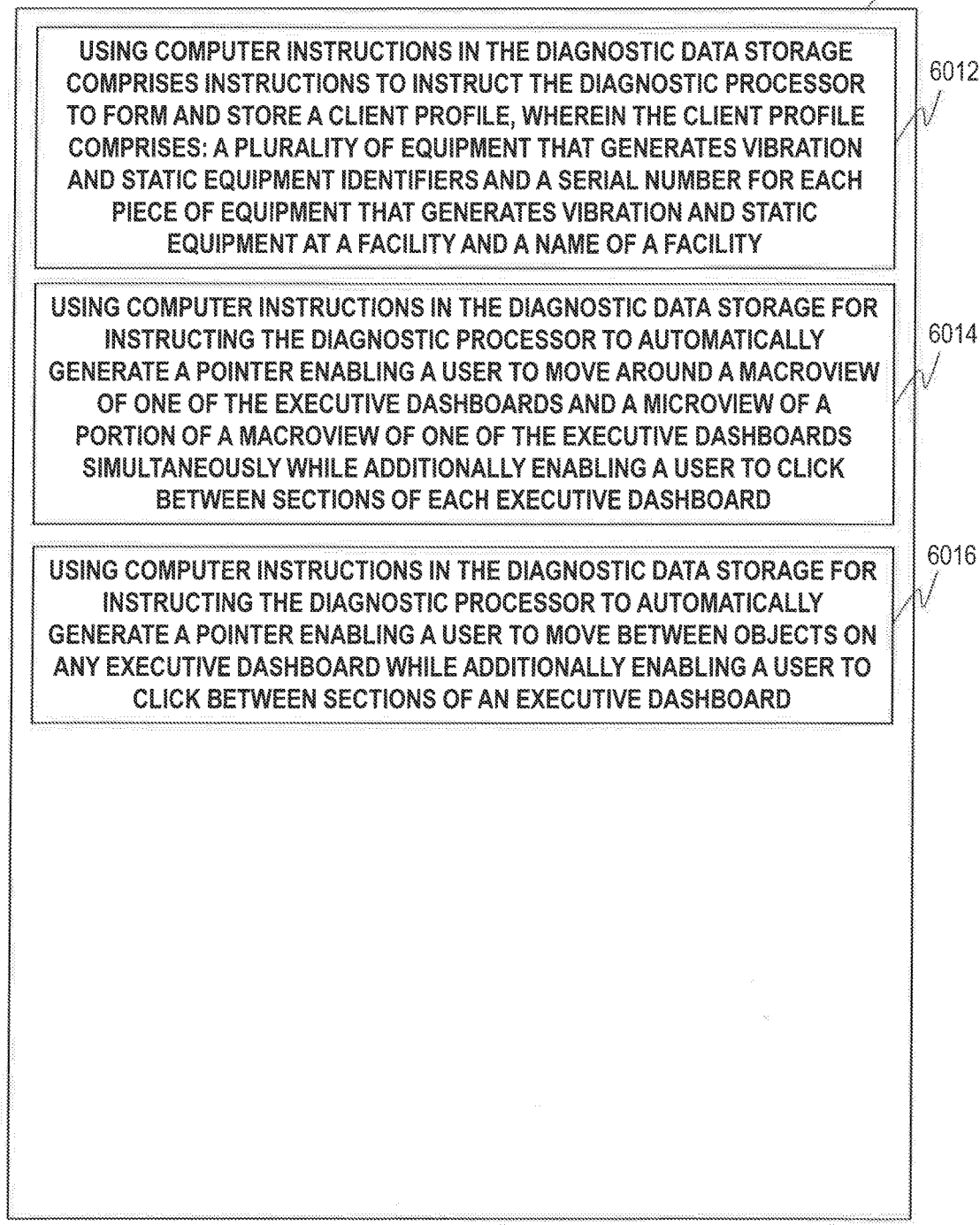

FIGS. 8A-B depict a sequence of steps to implement the method.

FIGS. 8A and 8B depict an exemplary method according to one or more embodiments.

The method 1000 for generating automatic real-time diagnostics for equipment that generates vibration and static equipment can include, but is not limited to the steps described below. The method can be utilized by a person of ordinary skill in the industry, and is not limited to a particular order or sequence.

The method involves installing a plurality of sensors on or mounted proximate to the equipment that generates vibration and static equipment, the plurality of sensors comprising a vibration sensor, and an acoustic emission sensor, and at least one of: a pressure sensor, a temperature sensor, a current sensor, a level of liquid sensor, a rotation frequency sensor, additional acoustic emission sensors, a shaft position sensor, a linear deformation sensor, as shown in box 6000.

Each of the plurality of sensors can be configured to transmit sensor data.

The method involves collecting sensor data using at least one peripheral intellectual measurement equipment (PIM) from the plurality of sensors, processing the sensor data by removing signal noise or averaging collected sensor data from a sensor over time, and then transmitting the processed sensor data as assembled data, as shown in box 6002.

The method includes receiving sensor data and assembled data using a plurality of diagnostic stations, wherein each diagnostic station with a diagnostic processor 24$ab$ is in communication with a diagnostic data storage and a diagnostic display and an enterprise network, and wherein each diagnostic station processor compares assembled data to threshold values for diagnostic features generating diagnostic information 28, using a diagnostic passport and the assembled data to calculate diagnostic features and calculate technical states for each diagnostic feature of all or portions of equipment that generates vibration and static equipment and generate diagnostic prescriptions for each diagnostic features, as shown in step 6004.

In embodiments, the data storage can have instructions to generate simultaneously a Monitor Executive Dashboard, a Trend Executive Dashboard, an Analysis Executive Dashboard, a Report Executive Dashboard, a System Executive Dashboard, and an Oscilloscope Executive Dashboard 3040.

The method involves communicating with the plurality of diagnostic processors through at least one of: the enterprise network and the global communication network using an administrative processor with administrative data storage and administrative display, the administrative data storage having instructions for the administrative processor to automatically collect and store the diagnostic information and automatically compile the diagnostic information into a diagnostic database, as shown in box 6006.

The method involves providing bidirectional communication with the plurality of diagnostic stations and the administrative processor to at least one client device with a client device processor, a client device data storage and client device display, as shown in box 6008.

Each client device can be configured to present the diagnostic information by each of the Monitor Executive Dashboard, Trend Executive Dashboard, Analysis Executive Dashboard, Report Executive Dashboard, System Executive Dashboard and Oscilloscope Executive Dashboard generated by the diagnostic processor.

In embodiments, the method automatically can generate real time diagnostic information from assembled data as a composite visualization of equipment in a facility by (i) portions of equipment in a facility, (ii) individual equipment in a facility, (iii) groups of equipment in a facility, and (iv) all equipment in a facility with the Monitor, Trend, Analysis, Report, System and Oscilloscope Executive Dashboards enabling a visualization of user selected diagnostic features, user selected trends, identification of equipment that generates vibration and static equipment, operational parameters enabling prediction of maintenance events associated with equipment that generates vibration and static equipment while presenting the equipment that generates vibration as virtual images with each virtual image having at least one virtual tag representing diagnostic information providing simultaneous and automatic real time diagnostic analysis, real time equipment trend updating, proposed maintenance schedules, and real time viewing of maintenance activities on at least one portion of equipment that generates vibration and static equipment.

The method can involve using the peripheral intellectual measurement equipment (PIM), as shown in box 6009.

The peripheral intellectual measurement equipment (PIM) can include a plurality of peripheral intellectual modules configured for receiving sensor data, a fieldbus connected to each of the plurality of peripheral intellectual modules receiving sensor data, a fieldbus controller receiving sensor data from each peripheral intellectual modules, and generating assembled data to a diagnostic processor directly or to a diagnostic processor through the enterprise network.

The method can involve using a portable vibrometer with a signal storage connected to at least one vibration sensor and sensors selected from the group consisting of: temperature sensors, and rotation frequency sensors, wherein each sensor and the portable vibrometer is configured for transmitting signals as assembled data to the diagnostic station directly or through the enterprise network, as shown in box 6010.

The method can involve using computer instructions in the diagnostic data storage to instruct the diagnostic processor to form and store a client profile, wherein the client profile can include a plurality of equipment that generates vibration and static equipment identifiers and a serial number for each piece of equipment that generates vibration and static equipment at a facility and a name of a facility, as shown in box 6012.

The method can involve using computer instructions in the diagnostic data storage for instructing the diagnostic processor to automatically generate a pointer enabling a user to move around a macroview of one of the Executive Dashboards and a microview of a portion of a macroview of one of the Executive Dashboards simultaneously while additionally enabling a user to click between sections of each Executive Dashboard, as shown in box 6014.

The method can involve using computer instructions in the diagnostic data storage for instructing the diagnostic processor to automatically generate a pointer enabling a user to move between objects on any Executive Dashboard while additionally enabling a user to click between sections of an Executive Dashboard, as shown in box 6016.

While these embodiments have been described with emphasis on the embodiments, it should be understood that within the scope of the appended claims, the embodiments might be practiced other than as specifically described herein.

What is claimed is:

1. A method for automatic real-time diagnostics for equipment that generates vibration and static equipment comprising:
    a. installing a plurality of sensors on or mounted proximate to the equipment that generates vibration and static equipment, the plurality of sensors comprising a vibration sensor, and an acoustic emission sensor, and at least one of: a pressure sensor, a temperature sensor, a current sensor, a level of liquid sensor, a rotation frequency sensor, additional acoustic emission sensors, a shaft position sensor, a linear deformation sensor, each of the plurality of sensors configured to transmit sensor data;
    b. collecting sensor data using at least one peripheral intellectual measurement equipment (PIM) from the plurality of sensors, processing the sensor data by removing signal noise or averaging collected sensor data from a sensor over time, and then transmitting the processed sensor data as assembled data;
    c. receiving sensor data and the assembled data using a plurality of diagnostic stations each diagnostic station with a diagnostic processor in communication with a diagnostic data storage and a diagnostic display and an enterprise network, each diagnostic station processor comparing the assembled data to threshold values for diagnostic features generating diagnostic information, and each diagnostic processor using a diagnostic passport and the assembled data to calculate diagnostic features and calculate technical states for each diagnostic feature of all or portions of the equipment that generates vibration and static equipment and generate diagnostic prescriptions for each diagnostic feature, the data storage having instructions to generate simultaneously a Monitor Executive Dashboard, a Trend Executive Dashboard, an Analysis Executive Dashboard, a Report Executive Dashboard, a System Executive Dashboard, and an Oscilloscope Executive Dashboard; and wherein
        (i) the Monitor Executive Dashboard automatically uses the sensor data and the assembled data to generate the diagnostic information simultaneously for: (i) portions of equipment in a facility, (ii) individual equipment in a facility, (iii) groups of equipment in a facility, and (iv) all equipment in a facility as a visual presentation: for monitoring by worst operating condition of at least one of: the portions of equipment in the facility, the individual equipment in the facility; the groups of equipment in the facility, and all equipment in the facility;
        (ii) the Trend Executive Dashboard automatically compares the diagnostic information to threshold values for diagnostic features and generates trends as a visual presentation;
        (iii) the Analysis Executive Dashboard automatically presents the assembled data as a visual presentation of signals in data forms comprising: spectra, cepstrums, and wavelets; and simultaneously (a) calculates each diagnostic feature and (b) creates and edits diagnostic rules and configurations stored in the diagnostic data storage;
        (iv) the Report Executive Dashboard automatically generates multiple reports using the diagnostic information based on preset user requests or according to a preset schedule for maintenance of equipment that produces vibration and static equipment;
        (v) the System Executive Dashboard automatically generates a visual interface enabling monitoring, configuration and control of the plurality of peripheral intelligent measurement equipment, the plurality of diagnostic stations and the plurality of sensors; and
        (vi) the Oscilloscope Executive Dashboard automatically generates a visual interface with a visual signal diagram of sensor data and operation parameters for channels and operational parameters for peripheral intellectual measurement equipment with synchronization in real time, when sensor data changes;
    d. communicating with the plurality of diagnostic processors through at least one of: the enterprise network and the global communication network using an administrative processor with administrative data storage and administrative display, the administrative data storage having instructions for the administrative processor to automatically collect and store the diagnostic information and automatically compile the diagnostic information into a diagnostic database;

e. providing bidirectional communication with the plurality of diagnostic stations and the administrative processor to at least one client device with a client device processor, a client device data storage and client device display, each client device configured to present the diagnostic information by each of the Monitor Executive Dashboard, Trend Executive Dashboard, Analysis Executive Dashboard, Report Executive Dashboard, System Executive Dashboard and Oscilloscope Executive Dashboard generated by the diagnostic processor; and wherein the method automatically generates real time diagnostic information from assembled data as a composite visualization of equipment in a facility by (i) portions of equipment in a facility, (ii) individual equipment in a facility, (iii) groups of equipment in a facility, and (iv) all equipment in a facility with the Monitor, Trend, Analysis, Report, System and Oscilloscope Executive Dashboards enabling a visualization of user selected diagnostic features, user selected trends, identification of equipment that generates vibration and static equipment, operational parameters enabling prediction of maintenance events associated with equipment that generates vibration and static equipment, while presenting the equipment that generates vibration as virtual images 21*i-l*, with each virtual image having at least one virtual tag representing diagnostic information providing simultaneous and automatic real time diagnostic analysis, real time equipment trend updating, proposed maintenance schedules, and real time viewing of maintenance activities on at least one portion of equipment that generates vibration and static equipment.

2. The method of claim 1, comprising using the peripheral intellectual measurement equipment (PIM) comprising:
a. a plurality of peripheral intellectual modules configured for receiving sensor data;
b. a fieldbus connected to each of the plurality of peripheral intellectual modules receiving sensor data; and
c. a fieldbus controller receiving sensor data from each peripheral intellectual module of the plurality of peripheral intellectual modules, and generating the assembled data to a diagnostic processor directly or to a diagnostic processor through the enterprise network.

3. The method of claim 1, comprising using a portable vibrometer with a signal storage connected to at least one vibration sensor and sensors selected from the group consisting of: temperature sensors, and rotation frequency sensors, wherein each sensor and the portable vibrometer is configured for transmitting signals as the assembled data to the diagnostic station directly or through the enterprise network.

4. The method of claim 1, wherein each sensor of the plurality of sensors are in a wireless connection with at least one peripheral intellectual measuring equipment.

5. The method of claim 1, wherein each client device is selected from the group consisting of: a cellular phone, a laptop, a desk top computer, or a tablet computer.

6. The method of claim 1, wherein the administrative processor and data storage are a cloud computing system.

7. The method of claim 1, comprising using computer instructions in the diagnostic data storage comprises instructions to instruct the diagnostic processor to form and store a client profile, wherein the client profile comprises: a plurality of equipment that generates vibration and static equipment identifiers and a serial number for each piece of equipment that generates vibration and static equipment at a facility and a name of a facility.

8. The method of claim 1, wherein the diagnostic data storage comprises a library of specifications including equipment physical parameters by type of equipment that generates vibration and static equipment, volume of fluid being moved by the equipment that generates vibration and static equipment, internal schematic diagram of the equipment that generates vibration and static equipment, quantity and type of shafts for the equipment that generates vibration, quantity and type of seals for the equipment that generates vibration and static equipment, quantity and types of rod for the equipment that generates vibration and static equipment quantity and type of bearings for the equipment that generates vibration and static equipment, quantity and types of gears for the equipment that generates vibration and static equipment, quantity and types of cylinders for the equipment that generates vibration and static equipment, quantity and types of valves for the equipment that generates vibration and static equipment, foundation for the equipment that generates vibration and static equipment, and a technology scheme for the equipment that generates vibration and static equipment, pipeline connections for the equipment that generates vibration and static equipment, and quantity and type of impellers for the equipment that generates vibration and static equipment.

9. The method of claim 7, wherein the Monitor Executive Dashboard comprises a plurality of diagnostic features for each vibration sensor comprising: vibration acceleration, vibration velocity, vibration displacement, speed of changes of vibration acceleration, rate of change of vibration velocity, rate of change of velocity displacement.

10. The method of claim 1, wherein the diagnostic prescription is generated with prewritten statement including: a check bearing, a check for imbalance, a check for misalignment, and a check for lubrication.

11. The method of claim 1, wherein the equipment that generates vibration and static equipment is located at a plurality of locations in a facility and the plurality of locations are presented on the Monitor Executive Dashboard.

12. The method of claim 1, wherein the equipment that generates vibration and static equipment comprises a motor, a rotary equipment, a centrifugal pump, a screw pump, a piston pump, a centrifugal compressor, a screw compressor, a piston compressor, gears, air coolers, fans, and blowers.

13. The method of claim 1, comprising using computer instructions in the diagnostic data storage for instructing the diagnostic processor to automatically generate a pointer, enabling a user to move around a macroview of one of the Executive Dashboards and a microview of a portion of a macroview of one of the Executive Dashboards simultaneously while additionally enabling a user to click between sections of each Executive Dashboard.

14. The method of claim 1, comprising using computer instructions in the diagnostic data storage for instructing the diagnostic processor to automatically generate a pointer enabling a user to move between objects on any Executive Dashboard while additionally enabling a user to click between sections of an Executive Dashboard.

15. The method of claim 1, wherein the diagnostic station data storage and administrative data storage each contain a diagnostic station identification, an enterprise identification, a diagnostic station access rights, a list of diagnostic stations in a facility, and reports.

16. The method of claim 15, wherein the diagnostic database comprises a list of configurations and a list of channels.

17. The method of claim 16, wherein the list of configurations comprises: a configuration identification, a parent configuration identification, a configuration channel identification, a configuration type, a list of configuration parameters, a diagnostic passport, a list of sections, a list of objects and diagnostic information.

18. The method of claim 17, wherein the list of configuration parameters comprises: a plurality of parameters, each parameter comprising a parameter identification, a parameter type, and a parameter value.

19. The method of claim 17, wherein diagnostic passport comprises: a plurality of object prototypes, each object prototype comprising: an object prototype identification, a schematic diagram with graphic images, a list of object prototype parameters, an object handler, a list of object part prototypes, and a list of measurement point prototypes.

20. The method of claim 19, wherein the list of object part prototypes comprises an object part prototype identification, an object part prototype type, a list of object part prototype parameters, and a list of diagnostic feature prototypes.

21. The method of claim 20, wherein the list of diagnostic feature prototypes comprises: a diagnostic feature prototype identification, a diagnostic feature prototype type, a diagnostic feature prototype measurement unit, a prototype default value, a prototype minimum value, a prototype maximum value, a prototype indicator position, a prototype signal processing rule, a prototype threshold, and a prototype diagnostic prescription.

22. The method of claim 21, wherein the prototype thresholds comprise: an unacceptable upper threshold, an action required upper threshold, an acceptable upper threshold, an unacceptable lower threshold, an action required lower threshold, and an acceptable lower threshold.

23. The method of claim 21, wherein the prototype diagnostic prescriptions comprises: an unacceptable upper prescription, an action required upper prescription, an acceptable upper prescription, an unacceptable lower prescription, an action required lower prescription, and an acceptable lower prescription.

24. The method of claim 19, wherein the list of measurement point prototypes contains a plurality of measurement point prototypes, and wherein each measurement point prototype comprises: a measurement point prototype identification, a measurement point prototype type, and a signal processing list.

25. The method of claim 24, wherein the signal processing list contains a list of references to diagnostic feature prototypes calculated for one of the measurement point prototypes.

26. The method of claim 17, wherein the list of sections in the diagnostic database further comprises for each section: a section identification, a vector graphic and an object image.

27. The method of claim 17, wherein the list of objects in the diagnostic database further comprises for each of the plurality of objects: an object identification, an object prototype identification, an object section, a screen position for an object, a child configuration identification, an original diagnostic station identification, a list of object parameters, a list of object parts, a list of measurement points and wherein each object in the list of object parts contains an object part prototype identification, a list of object part parameters, and a list of diagnostic features.

28. The method of claim 27, wherein the list of diagnostic features contains for each diagnostic feature: a diagnostic feature prototype identification, a diagnostic feature threshold, and a validation list.

29. The method of claim 27, wherein the list of measurement points comprises for each measurement point: a measurement point prototype identification, a measurement point channel identification, a validators list, and wherein the validators list contains references to diagnostic features which indicate an equipment state as nonfaulty or faulty.

30. The method of claim 1, wherein the diagnostic information comprises an initial time, an update time, a state, a summary state, a mode, a summary mode, a most hazardous object part of the configuration, a section state, a section summary state, a section mode, a section summary mode, a most hazardous object part of each section, an object state, an object summary state, an object summary mode, an object part state, an object part summary state, an object part repairs, an object part changes, an object part works, a hazard level of each object part, a measurement point state, a summary state, an update time, a diagnostic value, a diagnostic minimum, a diagnostic maximum, a diagnostic state, a diagnostic summary state, updates of each diagnostic feature, and a diagnostic data history.

31. The method of claim 16, wherein the list of channels has for each channel: a channel identification, a channel signal cache, a channel signal correction setting, a channel signal processing list 393, and a channel handler 394.

* * * * *